(12) United States Patent
Chui et al.

(10) Patent No.: US 6,904,176 B1
(45) Date of Patent: Jun. 7, 2005

(54) SYSTEM AND METHOD FOR TILED MULTIRESOLUTION ENCODING/ DECODING AND COMMUNICATION WITH LOSSLESS SELECTIVE REGIONS OF INTEREST VIA DATA REUSE

(75) Inventors: Charles K. Chui, Menlo Park, CA (US); Haishan Wang, Mountain View, CA (US)

(73) Assignee: LightSurf Technologies, Inc., Santa Cruz, CA (US)

( * ) Notice: Subject to any disclaimer, the term of this patent is extended or adjusted under 35 U.S.C. 154(b) by 562 days.

(21) Appl. No.: 09/999,760

(22) Filed: Oct. 31, 2001

Related U.S. Application Data
(60) Provisional application No. 60/323,652, filed on Sep. 19, 2001.

(51) Int. Cl.[7] .............................. G06K 9/36; G06K 9/32
(52) U.S. Cl. ....................................... 382/240; 382/298
(58) Field of Search ................................ 382/220, 232, 382/233, 240, 244, 246, 250, 253, 284, 298, 300; 348/14.01; 375/240.19, 240.2, 240.21, 240.22, 240.25; 358/426.13, 539–540

(56) References Cited

U.S. PATENT DOCUMENTS

| | | | | |
|---|---|---|---|---|
| 4,749,983 A | * | 6/1988 | Langdon, Jr. ................. 341/51 |
| 5,815,209 A | * | 9/1998 | Kondo et al. ........... 375/240.18 |
| 6,459,812 B2 | * | 10/2002 | Suzuki et al. ................ 382/232 |
| 6,473,207 B1 | * | 10/2002 | Miyamoto .................... 358/539 |
| 6,477,279 B2 | * | 11/2002 | Go .............................. 382/240 |
| 6,496,608 B1 | * | 12/2002 | Chui ........................... 382/300 |
| 6,549,675 B2 | * | 4/2003 | Chatterjee ................... 382/244 |
| 6,587,507 B1 | * | 7/2003 | Chui et al. ............. 375/240.19 |
| 6,600,785 B1 | * | 7/2003 | Nishigori et al. ...... 375/240.23 |
| 6,650,786 B2 | * | 11/2003 | Yokose et al. .............. 382/248 |
| 6,738,169 B1 | * | 5/2004 | Nakase ........................ 358/539 |

* cited by examiner

Primary Examiner—Andrew W. Johns
Assistant Examiner—Amir Alavi
(74) Attorney, Agent, or Firm—Blakely Sokoloff Taylor & Zafman; Judith A. Szepesi

(57) ABSTRACT

A method and apparatus for processing an image is described. In one embodiment, the method comprises: receiving a portion of an encoded version of a downsized image and one or more encoded residual images, decoding the portion of the encoded version of the downsized image to create a decoded portion of the downsized image, decoding a portion of at least one or more encoded residual images, enlarging the decoded portion of the portion of the downsized image, and combining the enlarged and decoded portion of the downsized image with a first decoded residual image to create a new image.

36 Claims, 35 Drawing Sheets

× = PIXEL VALUES
• = BILINEAR INTERPOLATED VALUES
△ = PIXEL REPLICATED VALUES

| 16 | 17 | 18 | 19 | 20 | 21 | 22 | 23 |
|----|----|----|----|----|----|----|----|
| 17 | 18 | 19 | 20 | 21 | 22 | 23 | 24 |
| 18 | 19 | 20 | 21 | 22 | 23 | 24 | 25 |
| 19 | 20 | 21 | 22 | 23 | 24 | 26 | 27 |
| 20 | 21 | 22 | 23 | 25 | 26 | 27 | 28 |
| 21 | 22 | 23 | 24 | 26 | 27 | 28 | 30 |
| 22 | 23 | 24 | 26 | 27 | 28 | 30 | 31 |
| 23 | 24 | 25 | 27 | 28 | 30 | 31 | 33 |

FIG. 4D

SYSTEM AND METHOD FOR TILED MULTIRESOLUTION ENCODING/ DECODING AND COMMUNICATION WITH LOSSLESS SELECTIVE REGIONS OF INTEREST VIA DATA REUSE

This application claims the benefit of 60/323,652 Sep. 19, 2001.

FIELD OF THE INVENTION

The present invention relates to the field of interactive image communication; more particularly, the present invention relates to image encoding and decoding to facilitate image communication between client and server and between clients and efficient display for any client device and on any display window resolution.

BACKGROUND OF THE INVENTION

Today, individuals are getting computer images on a number of different types of displays. For example, individuals are viewing images on their personal computers (PCs), personal digital assistants (PDAs), cell phones, and whole host of other devices. However, the displays on each of these devices are different sizes. Therefore, the highest resolution image that each could display may be different. It would be advantageous to be able to display the highest level resolution image for any device even though only a portion of the image fits the display window. The feature of panning allows the user to see other regions, and multiresolution for zooming enables display of the entire image for any window size.

For instance, it is quite common for a doctor to review images and make diagnosis recommendations based on that review. Currently, doctors are able to specify regions of interest in a particular image to view. However, doctors would like to be able to select a specific part of an image and get that portion of the image at a greater resolution. Being able to obtain a larger image may not be advantageous if the image is not lossless, because a doctor may have to rely on details appearing in the image to make a diagnoses. Therefore, it would be advantageous to send digital images so that selective regions of interest in images may be displayed losslessly and at varying resolution levels.

Today, images are transmitted in a compressed form. There are many compression techniques that are well known in the art. The most well-known ones are JPEG, GIF, PNG, and JPEG-2000. For lossless compression, the JPEG standard uses predication coding (DPCM), and for progressive viewing, the hierachal mode of JPEG depends on coding of prediction (or difference) error images. For more information, see W. B. Pennebar and J. L. Mitchell, "JPEG: Still Image JA Compression Standard," Van Norstrand Reihold Publisher, N.Y., 1993. As another example, see U.S. Pat. No. 4,749,983, entitled "Compression of Multi-level Signals." Furthermore, the MPEG standards (MPEG 1, 2 and 4) sets forth one coding standard, that includes the coding of P frames (or residual frames). This is essentially the same as coding prediction error images (after motion estimation and compensation are performed).

SUMMARY OF THE INVENTION

A method and apparatus for processing an image is described. In one embodiment, the method comprises receiving a portion of an encoded version of a downsized image and one or more encoded residual images, decoding the portion of the encoded version of the downsized image to create a decoded portion of the downsized image, decoding a portion of at least one of the one or more encoded residual images, enlarging the decoded portion of the portion of the downsized image, and combining the enlarged and decoded portion of the downsized image with a first decoded residual image to create a new image.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

FIG. 4D illustrates an example of quantizer $Q_2$ used in the MPG encoding of residual blocks of P frames.

FIG. 14 illustrates one embodiment of a process for decoding of tumbnail image tiles and preparing for first level zooming-in.

FIG. 15 illustrates one embodiment of a process for decoding of $\frac{1}{16}$ resolution image tiles for zooming-in.

DETAILED DESCRIPTION OF THE PRESENT INVENTION

Figure 1A:
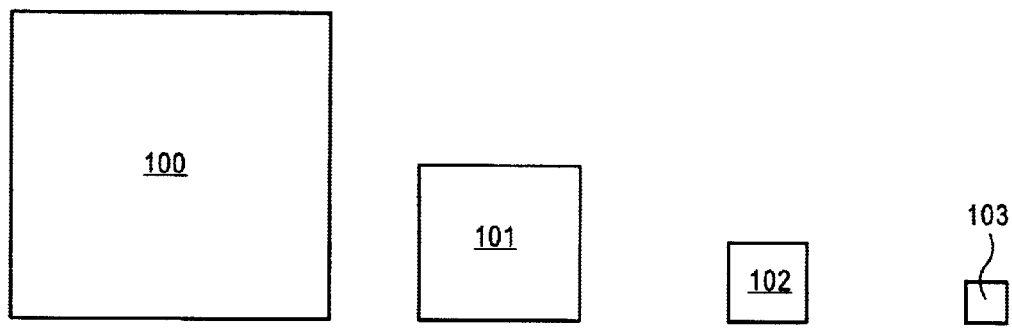
FIG. 1A illustrates an exemplary preparation of images of lower resolutions.

An image processing technique is described. In the following description, numerous details are set forth. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, C-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing or transmitting information in a form readable by a machine (e.g., a computer). For example, a machine-readable medium includes read only memory ("ROM"); random access memory ("RAM"); magnetic disk storage media; optical storage media; flash memory devices; electrical, optical, acoustical or other form of propagated signals (e.g., carrier waves, infrared signals, digital signals, etc.); etc.

Overview

The present invention takes digital images and performs encoding on the digital images to allow for subsequent decoding on a number of different display devices (e.g., personal computer (PC), personal digital assistant (PDA), cellular phone, notebook computer, television (TV), etc.) having different sized display screens. Therefore, the image bitstream must allow for the generation of different sized images for display.

The images may come from a variety of well-known sources. For example, the images may be generated by a camera, camcorder, scanner, or other image capture device. The captured digital image is divided into blocks, or tiles. In one embodiment, the captured digital image is divided up into 64-pixel×64-pixel tiles; however, other tiling arrangements may be used.

An Encoding Process

The encoding technique of the present invention is described below. The encoding technique is performed on each tile. In one embodiment, the encoding technique is performed on a local server. In the encoding process, an image which is an n×m sized pixel image is reduced in size to create a downsized image, which has a size p×g, where p is less than m and q is less than n. Both the original and downsized images are tiled into the same number of blocks (also called tiles), and each tile of the downsized image is subsequently enlarged using an enlarging technique to create an upsampled image, which is of the same size of the corresponding tile of the original digital image. The enlarged image tile is subtracted from the corresponding initial image tile to create a residual image tile.

Figure 1B:
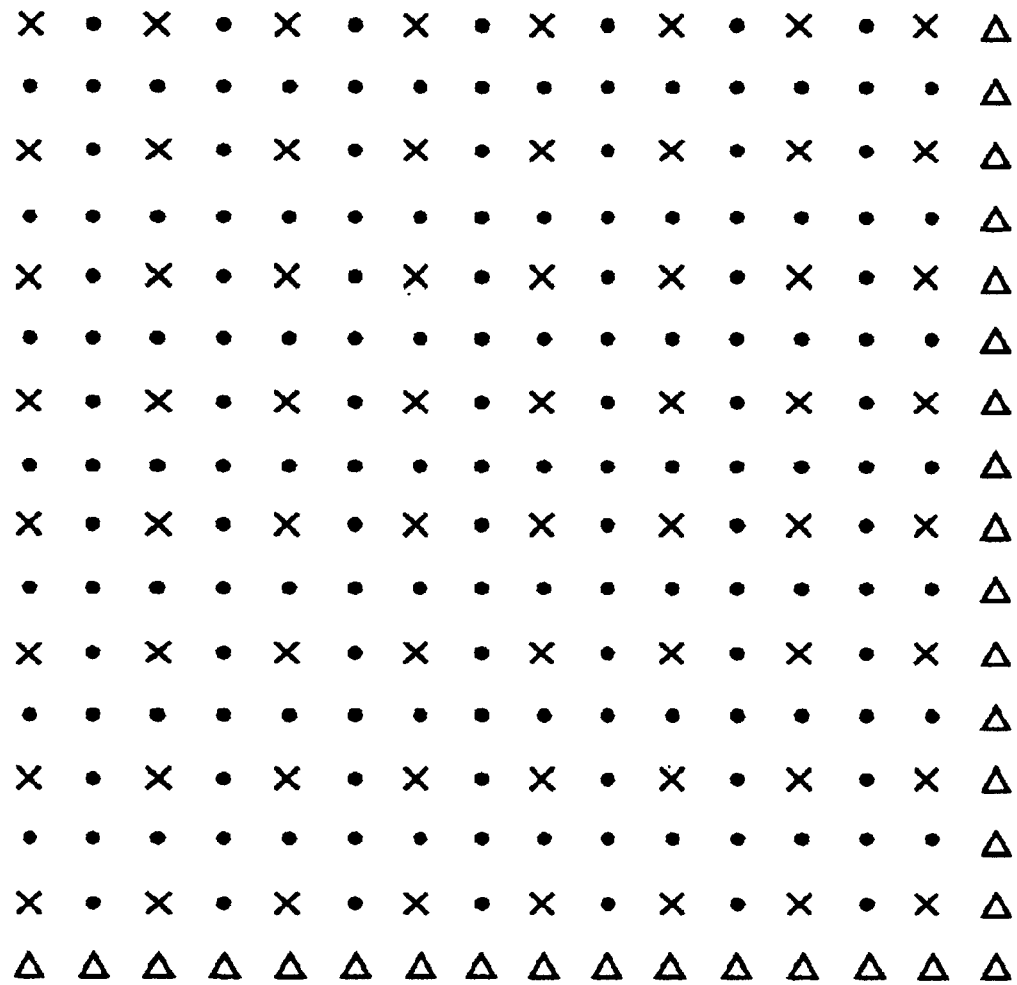
FIG. 1B illustrates Bi-linear interpolation with pixel replication along right-hand and lower borders.

One enlargement technique is described in conjunction with FIG. 1B. In one embodiment, the enlargement is performed according to the technique described in U.S. patent application Ser. No. 09/232,174, entitled "Image Data Interpolation System and Method" filed Jan. 15, 1999, and assigned to the corporate assignee of the present invention. In this patent application, the methodology fills in in-between pixel values using up to 12 neighboring data points. In an alternative embodiment, a standard well-known linear interpolation method is used, where the in-between pixel values $a_1$, $a_2$, $a_3$, $a_4$, and $a_5$ are determined as follows:

$$a_1 = (\tfrac{1}{2})(b+c)$$

$$a_2 = (\tfrac{1}{2})(b+d)$$

$$a_4 = (\tfrac{1}{2})(c+e)$$

$$a_3 = (\tfrac{1}{2})(a_2+a_4)$$

$$a_5 = (\tfrac{1}{2})(d+e)$$

Both downsized images and residual images are encoded using an encoder. The entropy coders may comprise lossless or reversible coders. In one embodiment, the entropy coder comprises the same entropy coder as in JPEG, i.e. run length and Huffman, and is referred to in the figures and below as encoder $E_1$. Thus, each downsized image may be JPEG encoded in such a manner that it may be decoded by a JPEG decoder. In an alternative embodiment, the entropy coder comprises the same entropy coder used in MPEG in coding interblocks of residual frames, which is well-known in the art. This entropy coder is referred to herein in the figures and below as encoder $E_2$. In still another embodiment, the entropy coder comprises adaptive spline-wavelet matching of "edges" of the residual image tiles, and is referred to herein in the figures as $E_3$. Examples of this encoder are described in U.S. application Ser. No. 09/445,100, entitled "System and Method for Encoding Video Data Using Computationally Efficient Adaptive Spline Wavelets", filed 03 Mar. 2000 and assigned to the corporate assignee of the present invention. Note that other entropy coders such as matching pursuit may be used for $E_3$.

Figure 25:
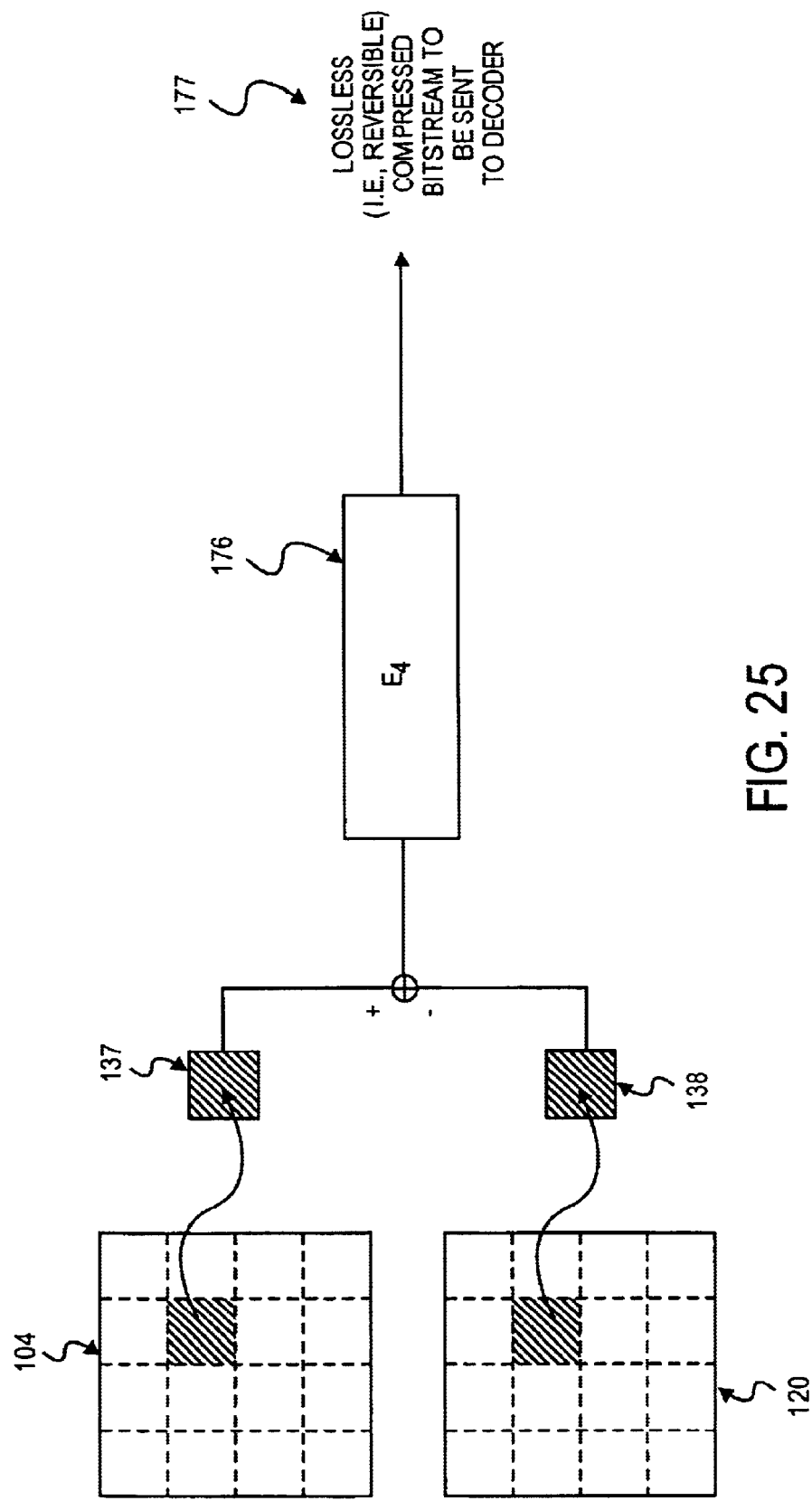
FIG. 25 illustrates lossless encoding of subtiles of a $(i,j)^{th}$-tile of an image.

For lossless encoding of certain tiles that contain the regions of interest, the reversible encoder $E_4$, in FIG. 25 is used. Typical examples of encoder $E_4$ include, but are not limited to, DPCM, PNG, and GIF.

For lossy compressioning in one embodiment, the coding described herein includes quantization. This quantization is not reversible. In one embodiment, the quantizer comprises the quantizer used in JPEG. In an alternative embodiment, the quantizer comprises the quantizer used in MPEG in coding inter-blocks of residual frames.

Detailed Discussion of Encoding Process

In one embodiment, the encoding process begins with processing logic operating on an original digital image. The digital image may be generated as a result of being captured (via, e.g., a digital camera), scanned, etc. Using the digital image, processing logic prepares, by image re-sizing, a set of different versions of the original image at various resolutions. For example, in one embodiment, lower resolution images of $\tfrac{1}{4}(=\tfrac{1}{2}\times\tfrac{1}{2})$ resolution, $\tfrac{1}{16}(=\tfrac{1}{4}\times\tfrac{1}{4})$ resolution, and $\tfrac{1}{64}(\tfrac{1}{8}\times\tfrac{1}{8})$ resolution, etc., of the original image. These resolutions (of the same image) are shown in FIG. 1A. Referring to FIG. 1A, full resolution image 100 is shown as the original picture, image a ¾ resolution version of image 100 is shown as image 101, a $\tfrac{1}{16}$-resolution version of image 100 is shown as image 102 and a $\tfrac{1}{64}$-resolution version of image 100 is shown as image 103. Image 103 may comprise a thumbnail. A number of different re-sizing methods may be used for this purpose. These may be found in the literature or commercial software (such as Photoshop) can be used for this purpose. One embodiment of a resizing technique that may be used is described in U.S. patent application Ser. No. 09/999,817 entitled "Spline-Signal Recoverable Decimation Filters", concurrently filed with this application, incorporated herein by reference, and assigned to the corporate assignee of the present invention.

Figure 2A:
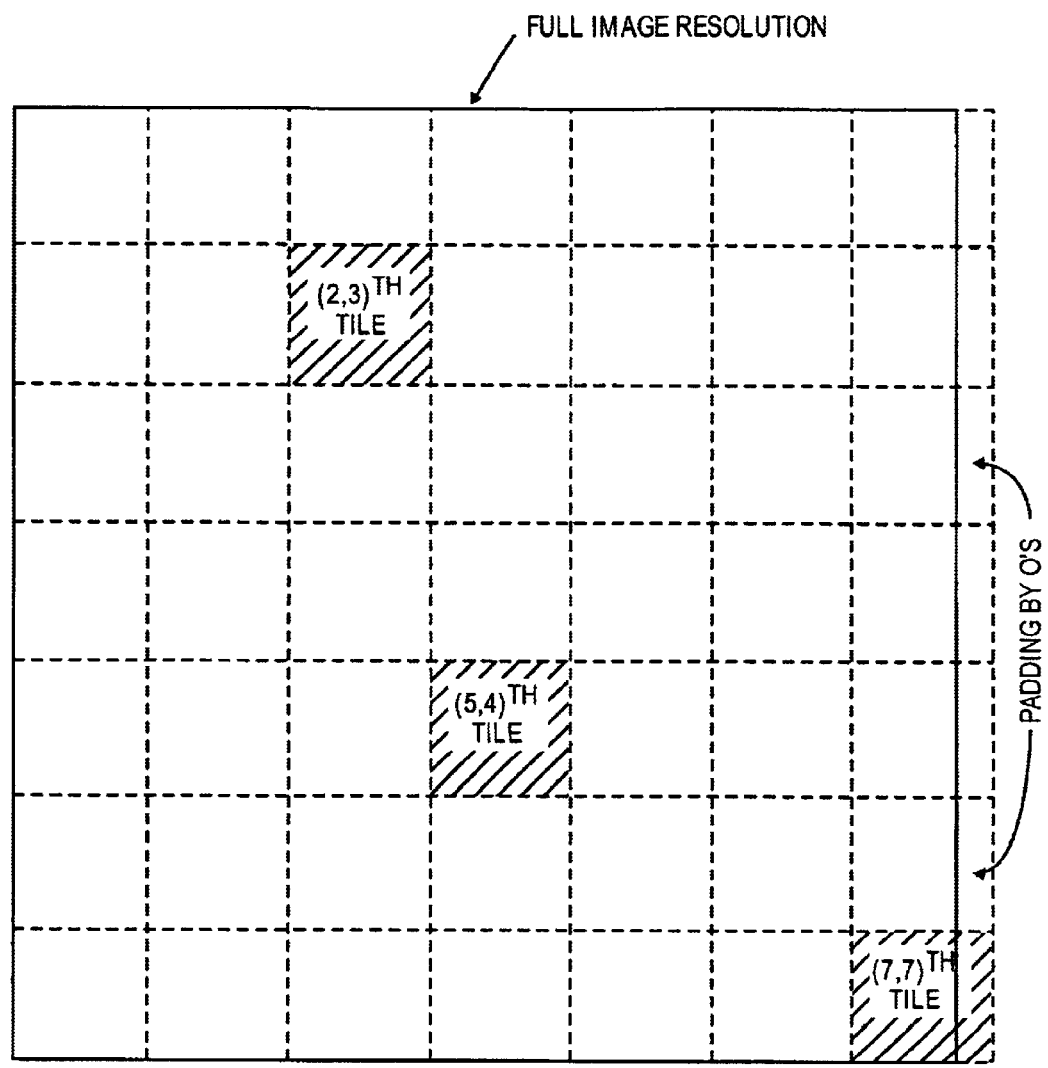
FIG. 2A illustrates an exemplary tiling of full resolution image.
Figure 2B:
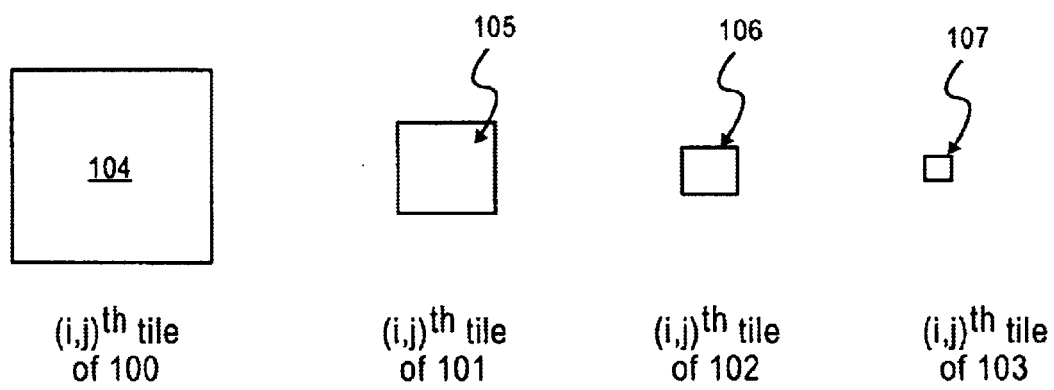
FIG. 2B illustrates corresponding tiles of the same image of different resolutions from FIG. 1A.

Next, processing logic divides each image of different resolution into a number of tiles. For example, if a full resolution image is divided into 128×128 tiles, then a ¼-resolution image has tiles with a tile size of 64×64, a $\tfrac{1}{16}$-resolution image has tiles with a tile size 32×32, and the $\tfrac{1}{64}$-resolution image has tiles with a tile size of 16×16, as shown in FIG. 2B. Referring to FIG. 2B, tile 104 is the (i,j)th tile of image 100 of FIG. 1A, tile 105 is the (i,j)th tile of image 101 of FIG. 1A, tile 106 is the (i,j)th tile of image 102 of FIG. 1A, and tile 107 is the (i,j)th tile of image 103 in FIG. 1A. When the image cannot be divided evenly, padding by 0's may be necessary as shown in FIG. 2A. Referring to FIG. 2A, an image at full resolution is shown divided into equal sized square tiles. Because the last column of tiles are not square, zeros have been added onto the right edge of the image to enable the last column of tiles to be square. Padding is well-known in the art.

Once the images of different resolutions are divided into tiles, processing logic may label the tiles by (1,1), (1,2), ..., (1,n) (2,1), (2,2), ..., (2,n), ..., (m,1), ... (m,n). FIG. 2A shows some labeled tiles. To reiterate, in one embodiment, the same number of tiles for each image resolution are generated.

Figure 3A:
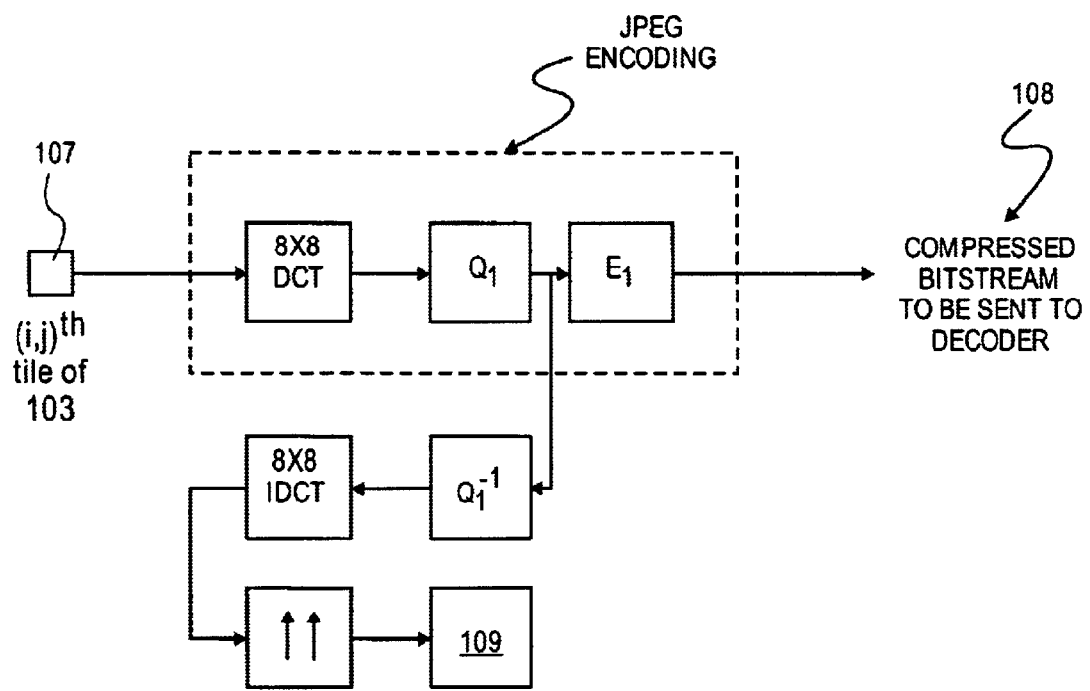
FIG. 3A illustrates one embodiment of a process for JPEG compression of tiles of a thumbnail image, and preparation for a residual image.
Figure 3B:
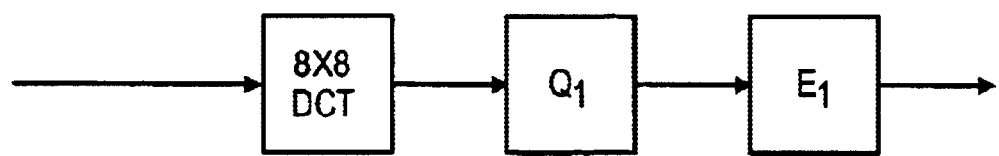
FIG. 3B illustrates a JPEG encoder.

Processing logic encodes each tile by encoding the (i,j)th tile of the lowest resolution (e.g., tile 107 of image 103) using JPEG as shown in FIG. 3A. Tile 107, which is the (i,j)th tile of image 103, is JPEG encoded using a JPEG encoder to create compressed bitstream 108 to be sent to the decoder. In one embodiment, when compressed bitstream 108 is decoded, it represents blocks (or tiles) of a thumbnail. FIG. 3B illustrates one embodiment of a JPEG encoder and includes an 8×8 DCT transform followed by the application of quantizer $Q_1$ and entropy encoder $E_1$, which represent the quantizer and entropy encoder used in JPEG. JPEG encoding, including the application of quantizer $Q_1$ and the application entropy encoder $E_1$, are well-known in the art.

Referring back to FIG. 3A, an 8×8 DCT transform is applied to tile 107 to create a tile of coefficients. Quantizer $Q_1$ is applied to the tile of coefficients in a manner well-known in the art to create a quantized DCT transformed image tile. Thereafter, the quantized DCT transferred image tile output from quantizer $Q_1$ is entropy encoded with entropy encoder $E_1$ to create compressed bitstream 108.

The quantized DCT transformed image tile is also processed to (degrated) image tile and enlarged to create a residual image (e.g., residual image 109) as shown in FIG. 3A. Specifically, a dequantizer $Q_1^{-1}$ and a inverse 8×8 DCT (IDCT) are applied to the quantized DCT transformed image tile to produce an intermediate tile. The intermediate tile undergoes an enlargement process to create residual image 109. In one embodiment, the enlargement process results in residual image 109 undergoing a 4× enlargement (with 2× for width and 2× for height).

There are a number of different enlargement techniques that may be used to enlarge an image. One embodiment of an enlargement technique that may be used is bi-linear interpolation, with pixel replication padding on the last row(s) and last column(s) (on the right and bottom, respectively) as shown in FIG. 1B. Bi-linear interpolation is well known in the art. In an alternate embodiment, the enlargement technique is the application 4-tap filter as set forth in U.S. patent application Ser. No. 09/232,174. In still another alternative embodiment, the enlargement technique that may be used is pixel replication, as performed in a manner well-known in the art.

Thereafter, processing logic encodes the first residual tile.

Figure 4A:
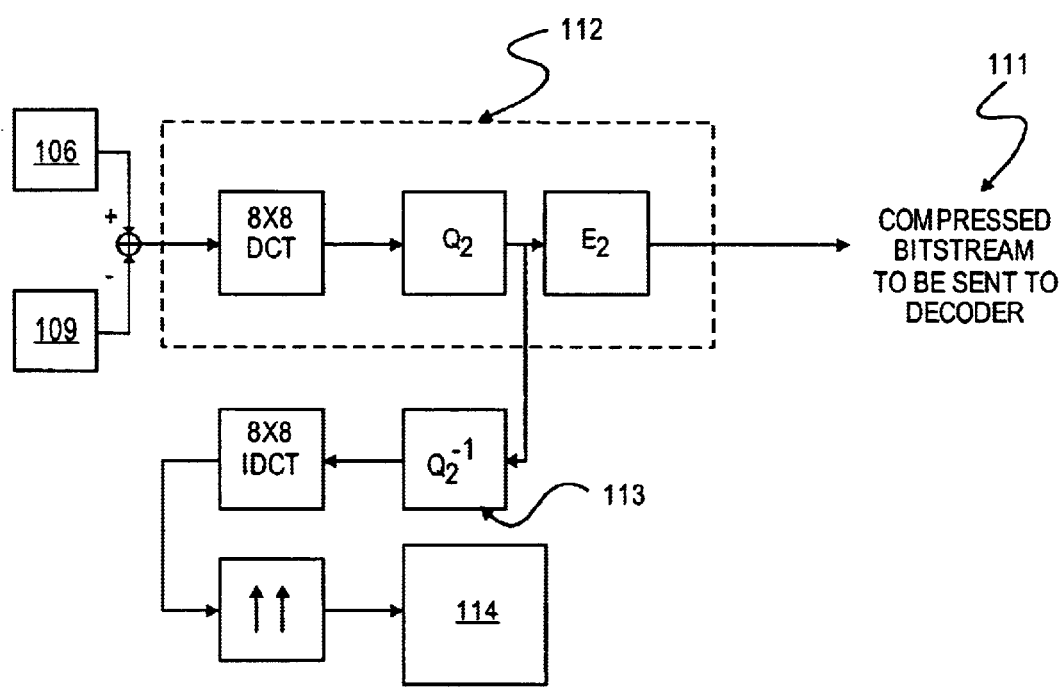
FIG. 4A illustrates one embodiment of a process for encoding residual image tiles and preparing the next residual image.
Figure 4B:
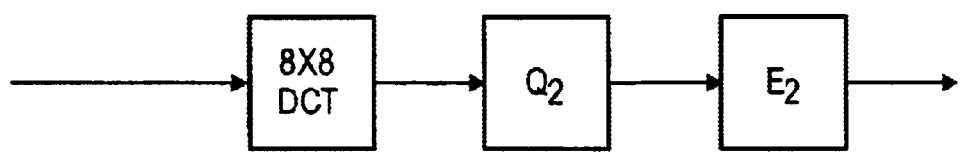
FIG. 4B illustrates an encoder from MEG for encoding interblocks of residual frames.

FIG. 4A illustrates one embodiment of a process for encoding residual image tiles and preparing the next residual image. Referring to FIG. 4A, tile 106 (from FIG. 2B), representing the (i,j)th tile of image 102 is subtracted from residual image 109 (from FIG. 3A) and the resulting difference image undergoes encoding via an MPEG encoder 112. In one embodiment, encoder 112 is the encoder in MPEG for encoding intra-blocks of residual frames as shown in FIG. 4B. Note that one embodiment of quantizer $Q_2$ is shown in FIG. 4D and is different from the quantizer $Q_1$ used in JPEG and the fixed Huffman Table in encoder $E_2$ is different from the Huffman table in encoder $E_1$.

Referring back to FIG. 4A, the results of applying the MPEG encoder 112 to the difference image that is generated by subtracting residual image 109 from tile 106 is compressed bitstream 111. Compressed bitstream 111 is sent to a decoder.

The quantized DCT transformed image tile output from quantizer $Q_2$ of MPEG encoder 112 is processed further and enlarged. More specifically, an inverse dequantizer $Q_2^{-1}$ 113 and 8×8 inverse DCT (IDCT) transform are applied to the quantized DCT transform image tile output from quantizer $Q_2$ to create an intermediate image. The intermediate image is enlarged to create a second residual image 114. Again, the enlargement process results in the intermediate image being enlarged by 4×(with 2× for width and 2× for height).

There are alternative embodiments for encoding the residual image. In one alternative embodiment, MPEG encoder 112 is replaced by a JPEG encoder, such as the JPEG encoder shown in FIG. 3B, and the dequantizer $Q_2^{-1}$ (113) is replaced by dequantizer $Q_1^{-1}$ as shown in FIG. 3A.

Figure 5:
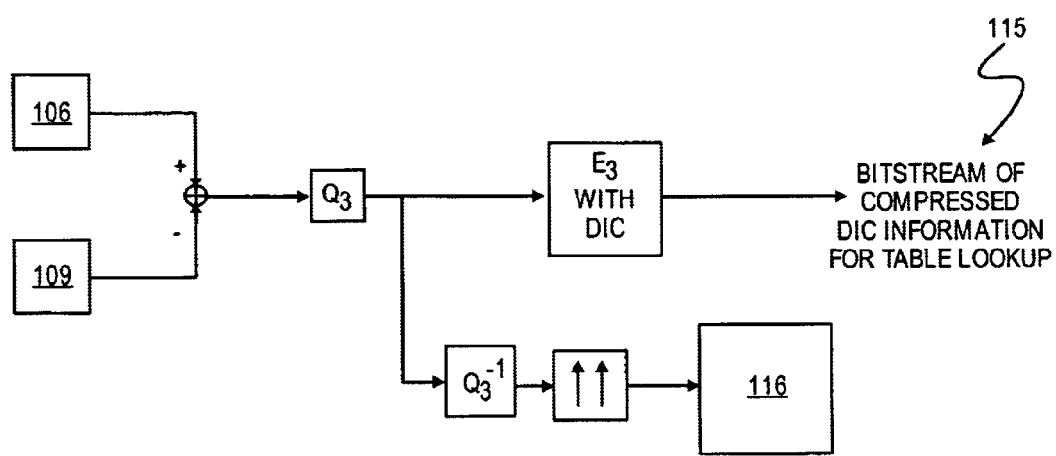
FIG. 5 illustrates an alternative embodiment of a process for encoding residual image tiles and preparing a next residual image.

In a second alternative embodiment, the MPEG encoder 112 is replaced by quantizer $Q_3$ and encoder $E_3$ as shown in FIG. 5, which are described in U.S. patent application Ser. No. 09/445,100, entitled "System and Method for Encoding Video Data Using Computationally Efficient Adaptive Spline Wavelets," and assigned to the corporate assignee of the present invention. Here, $Q_3$ is mainly thresholding that highlights "edge" images which are encoded by matching with adaptive spline wavelets.

In a third alternative embodiment, MPEG encoder 112 is replaced by quantizer $Q_3$ and encoder $E_3$ as shown in FIG. 5 using a Matching Pursuit using Matching Pursuit, as described in R. Neff and A. Zakhor, "Very Low Bit Rate Video Coding Based on Matching Pursuits," IEEE Trans. Circuits and Systems for Video Technology, Special MPEG Issue, Vol. 7, No. 1, February 1997.

The embodiment of FIG. 5 may be employed in a server. The encoding operation is, in general, slower than the embodiment in FIG. 4A, but the decoding operation is faster since only table lookups are used to decode the edge images.

It should be noted that when the last two alternate embodiments are used, dictionaries are used in the encoders and decoders. The encoder selects the matches from the dictionary and sends this information (after encoding) to the decoder. The decoding simply involves a table-look up from the same dictionaries. For spline-wavelets in the second alternative embodiment, the dictionary is a collection of numbers, which represent spline coefficients. For the matching pursuit alternative embodiment, the dictionary is a collection of curves (e.g., modulated gaussian's)

Figure 6:
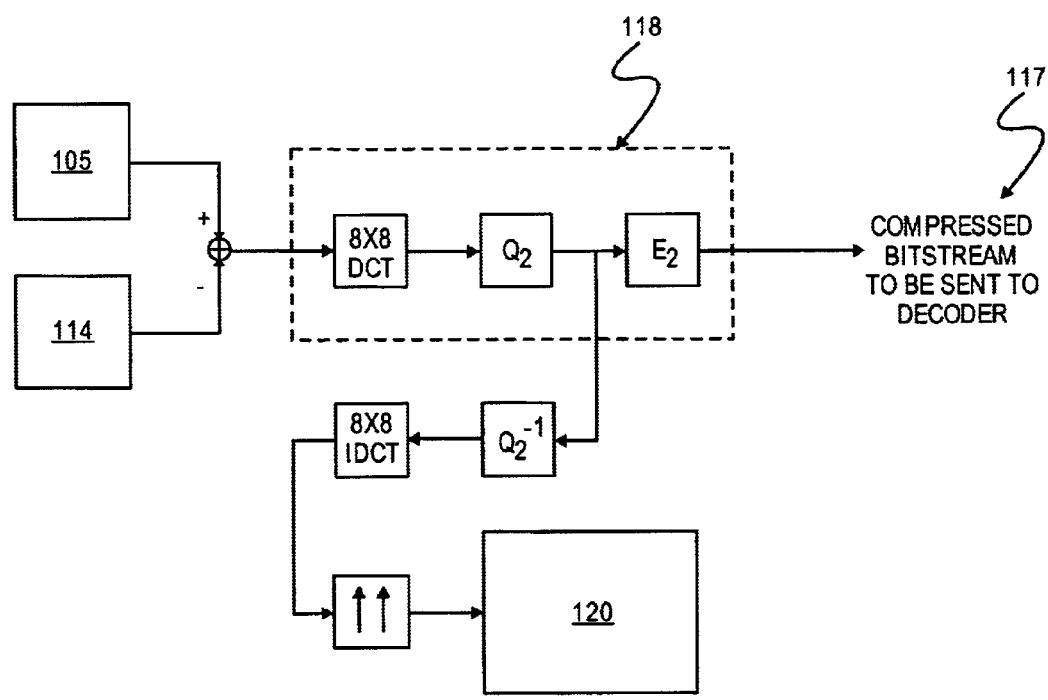
FIG. 6 illustrates one embodiment of a process for encoding residual image tiles and preparing a next residual image.

For desktop personal computers (PCs) and devices with sufficient processing power and memory, the same process for encoding residual images is repeated with minor changes as shown in FIG. 6.

Referring to FIG. 6, tile 105 (from FIG. 2B), representing the (i,j)th tile of image 101 is subtracted from residual image 114 (from FIG. 4A) and the resulting difference image undergoes encoding via an MPEG encoder 118. In one embodiment, encoder 118 is the encoder in MPEG for encoding intra-blocks of residual frames as shown in FIG. 4B and one embodiment of quantizer $Q_2$ is shown in FIG. 4D.

Referring back to FIG. 6, the results of applying the MPEG encoder 118 to the difference image that is generated by subtracting residual image 114 from tile 105 is compressed bitstream 117. Compressed bitstream 117 is sent to a decoder.

The quantized DCT transformed image tile output from quantizer $Q_2$ of MPEG encoder 112 is processed further and enlarged. More specifically, an inverse dequantizer $Q_2^{-1}$ and 8×8 IDCT are applied to the quantized DCT transform image tile output from quantizer $Q_2$ to create an intermediate image. The intermediate image is enlarged to create a second residual image 120 using an enlargement process (e.g., FIG. 1B). In one embodiment, the enlargement process results in the intermediate image being enlarged by 4× (with 2× for width and 2× for height).

Figure 7:
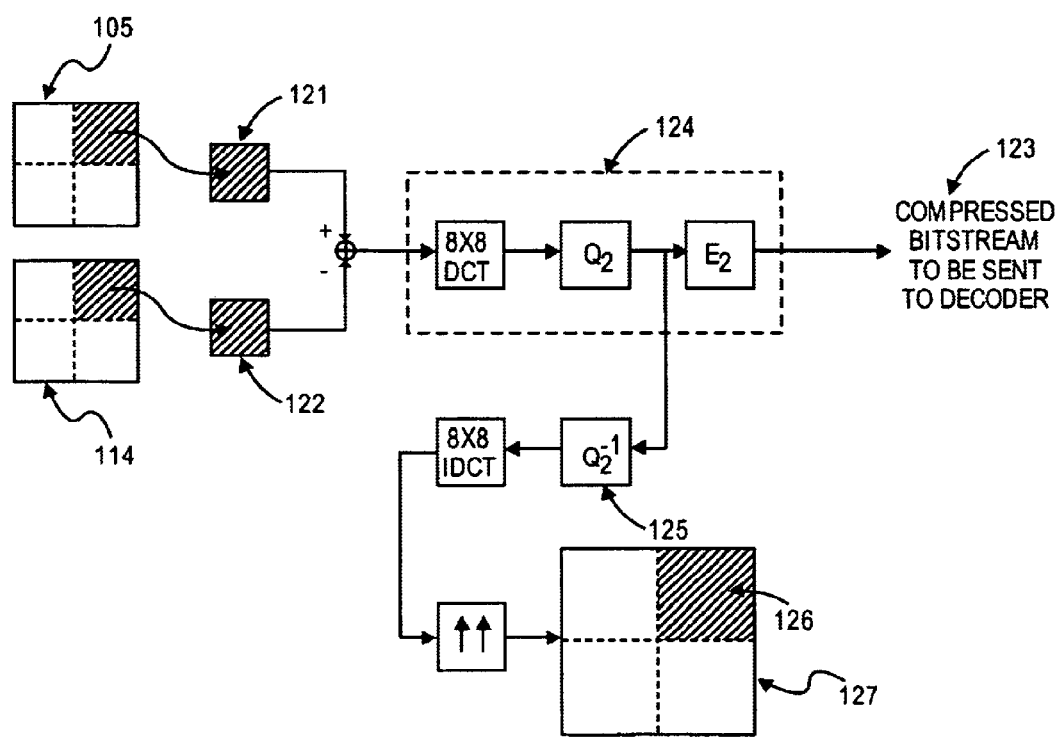
FIG. 7 illustrates one embodiment of a process for encoding residual image sub-tiles and preparing a next residual image.

However, for hand-held devices with smaller display windows (and possibly insufficient processing power and memory (for panning, for example,)), images 105 and 114 in FIG. 6 are divided into 4 equal blocks as shown in FIG. 7. For example, tile 105 of which is the (i,j)th tile of image 100, is decoded into 4 sub-tiles, including sub block 121, while tile 114, which is the second residual image generated using the encoding in FIG. 4A, is decoded into 4 sub-tiles, including sub block 122. Each sub-block (or sub-tile) is encoded as shown in FIG. 7 using the same encoding procedure as shown in FIG. 4A to produce compressed bitstream 123 to be sent to a decoder. For example, the difference image resulting from subtracting sub-block 122 of tile 114 from sub block 121 of tile 105 is MPEG encoded. The same process as shown in FIG. 4A is also used to create a sub block (or sub-tile), such as sub-block 126 of residual image 127. Hence, FIG. 7 is used 4 times for each original tile.

The embodiment shown in FIG. 7 may facilitate zooming in on an image. This is because the decoder only has to decode a portion of one or more subtiles to create the display on the screen.

The procedure in FIG. 6 may be applied in conjunction with the previously disclosed alternate embodiments. For example, encoder 118 and encoder 124 may be replaced by a JPEG encoder (with dequantizer $Q_2^{-1}$ replaced by dequantizer $Q_1^{-1}$), and also for adaptive spline-wavelet and matching pursuit encoding shown in FIG. 8 and FIG. 9, respectively.

Figure 8:
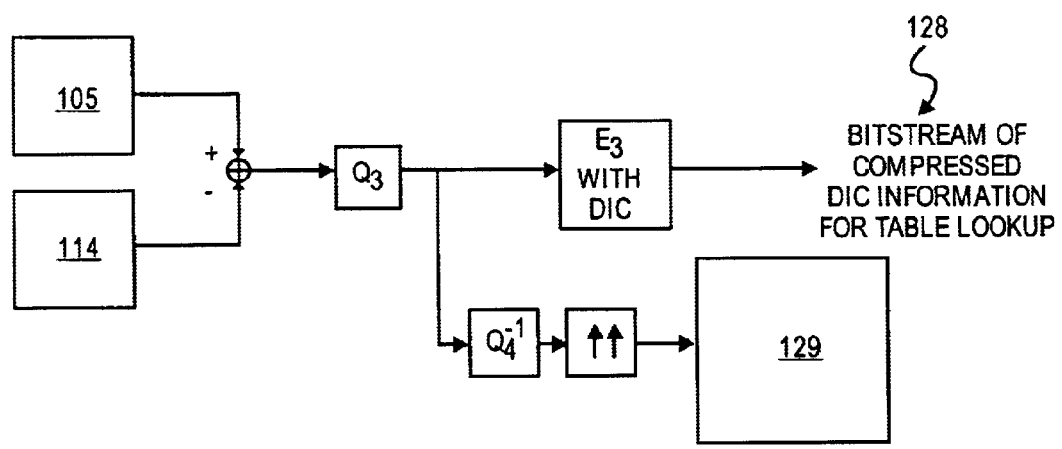
FIG. 8 illustrates an alternative embodiment of a process for encoding residual image tiles and preparing a next residual image.

FIG. 8 illustrates an alternative embodiment of a process for encoding residual image tiles and preparing for the next residual image. This is particularly suited for use on a PC. Referring to FIG. 8, processing logic subtracts tile 114, the second residual tile (from FIG. 4A), from tile 105, the (i,j)th tile of image 101 (FIG. 1A) to create a difference image. Then processing logic performs quantization on the difference image using quantizer $Q_3$. Next, processing logic performs entropy encoding on the quantized difference image output from quantizer $Q_3$ using entropy encoder $E_3$ (with a dictionary). The output of entropy encoder $E_3$ is bitstream 128, which comprises a bitstream of compressed dictionary information for subsequent table look-up during decoding.

Processing logic also performs dequantization on the output of quantizer $Q_3$ using dequantizer $Q_4^{-1}$ and performs an enlargement operation on the dequantized output of dequantizer $Q_4^{-1}$. The enlargement process results in an enlargement of 4× the dequantized output of $Q_4^{-1}$ as described below. The result of the enlargement process is a third residual image 129.

Figure 9:
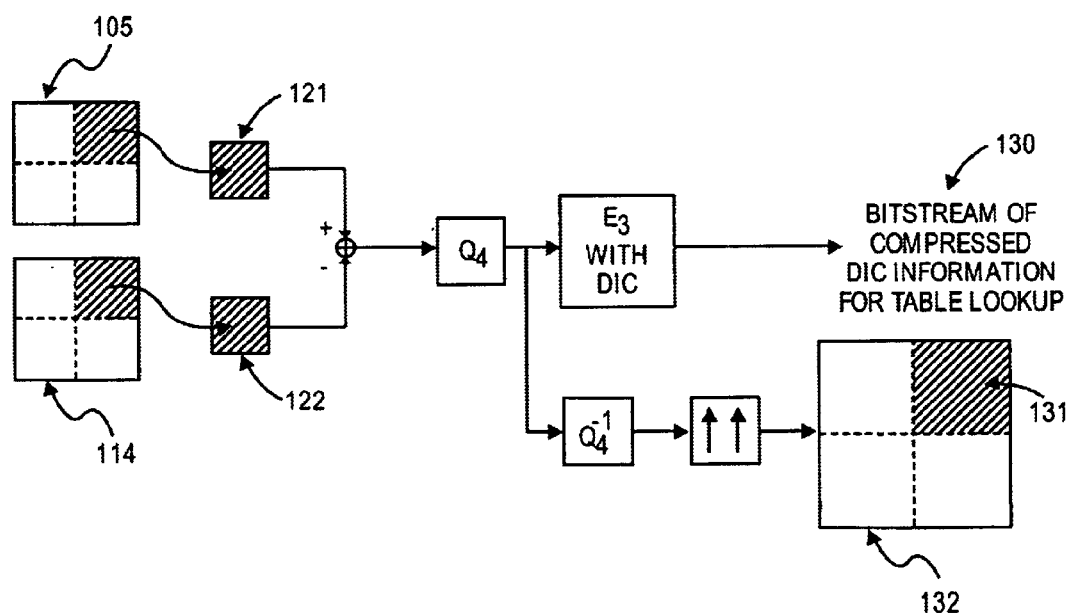
FIG. 9 illustrates an alternative embodiment of a process for encoding residual image sub-tiles and preparing a next residual image.

FIG. 9 illustrates an alternative embodiment of a process for encoding residual image sub-tiles and preparing for the next residual image. FIG. 9 is more suitable for devices with a smaller amount of available processing power, such as, for example, a handheld device, such that the image processing is divided into a number of sub-tile operations. The results of the operations on individual sub-tiles are combined to create an encoded tile.

Referring to FIG. 9, processing logic subtracts tile 122, a sub-tile of residual image 114 (from FIG. 4A), from sub-tile 121 of tile 105, the (i,j)th tile of image 101 (FIG. 1A), to create a difference image. Then processing logic performs quantization on the difference image using quantizer $Q_4$. Next, processing logic performs entropy encoding on the quantized difference image output from quantizer $Q_4$ using entropy encoder $E_3$ (with a dictionary). The output of entropy encoder $E_3$ is bitstream 130, which comprises a bitstream of compressed dictionary information for subsequent table look-up during decoding.

Processing logic also performs dequantization on the output of quantizer $Q_4$ using dequantizer $Q_4^{-1}$ wand performs an enlargement operation on the dequantized output of dequantizer $Q_4^{-1}$. The enlargement process results in an enlargement of 4× the dequantized output of $Q_4^{-1}$. The result of the enlargement process is a sub-tile 131 of a third residual image 132.

The next stage of encoding residual produces even larger blocks. In one embodiment, images are divided into 4 blocks (for desk-top PCs and other devices with sufficient power/memory) as in FIGS. 10 and 16 blocks (for handheld, etc.) as in FIG. 11.

Figure 10:
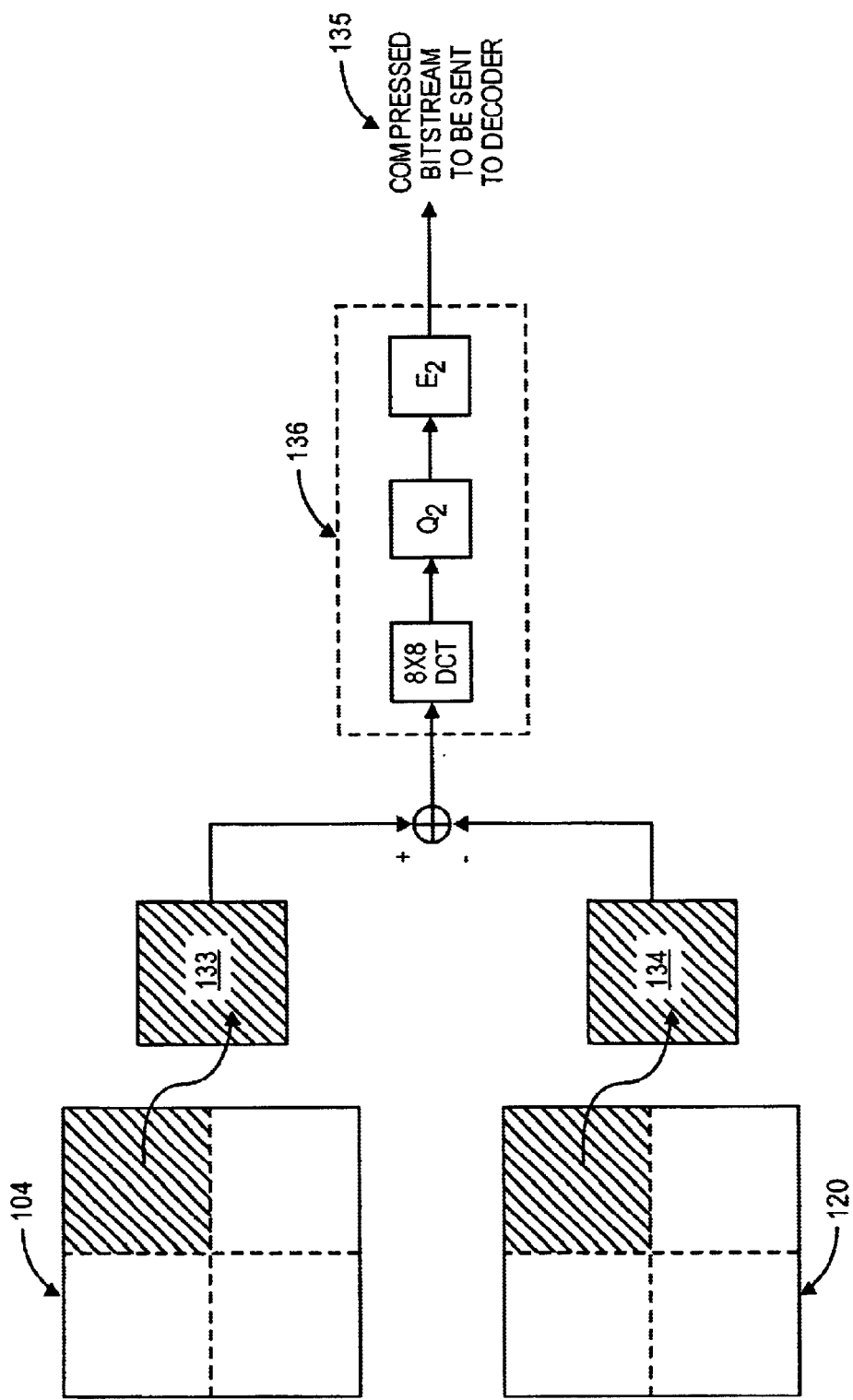
FIG. 10 illustrates one embodiment of a process for encoding residual image sub-tiles.

FIG. 10 illustrates one embodiment of a process for encoding residual image sub-tiles. Referring to FIG. 10, processing logic subtracts sub-tile 134, a sub-tile of residual image 120 (from FIG. 6), from sub-tile 133 of tile 104, the (i,j)th tile of image 101 (FIG. 1A), to create a difference image. Then processing logic performs entropy encoding on the difference image using encoder 136, which is the encoder from MPEG for encoding intrablocks of residual frames as shown in FIG. 4B. The output of entropy encoder $E_2$, which is the output of encoder 136, is compressed bitstream 135. Compressed bitstream 135 is to be sent to a decoder.

Figure 11:
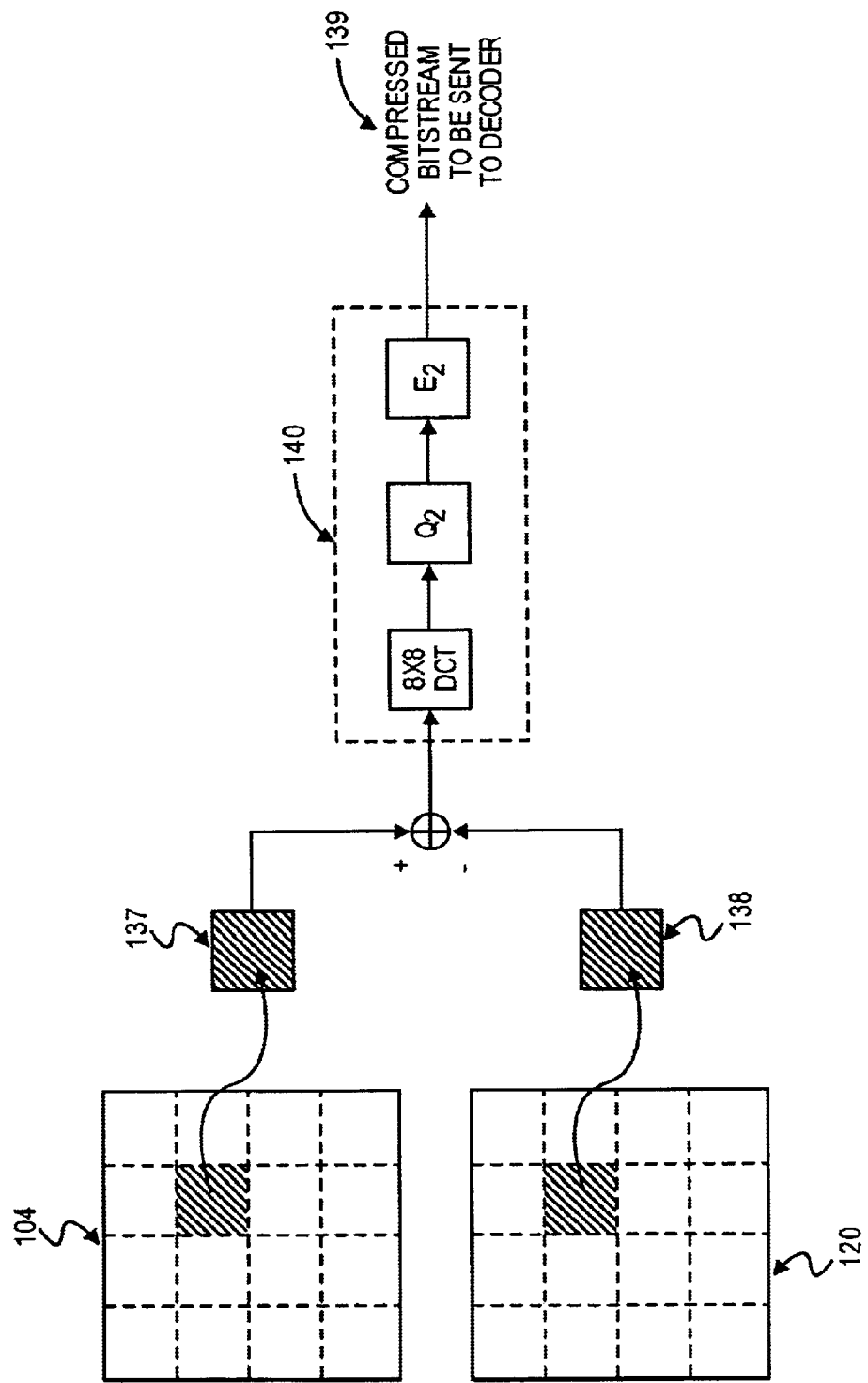
FIG. 11 illustrates one embodiment of a process for encoding of smaller residual image sub-tiles.

FIG. 11 illustrates one embodiment of a process for encoding smaller residual image sub-tiles than in FIG. 10. This process may be particularly useful for handheld devices. Referring to FIG. 11, the process begins by processing logic dividing each tile, tiles 104 and 120, into a number of different sub-tiles, such as 16 sub-tiles, with each of the sub-tiles being 32×32. The subsequent processing is performed on all the subtiles. Processing logic subtracts sub-tile 138, a sub-tile of residual image 120 (from FIG. 6), from sub-tile 137 of tile 104, the (i,j)th tile of image 101 (FIG. 1A), to create a difference image. Then processing logic performs entropy encoding on the difference image using encoder 140, which is the encoder from MPEG for encoding intrablocks of residual frames as shown in FIG. 4B. The output of entropy encoder $E_2$, which is the output of encoder 140, is compressed bitstream 139. Compressed bitstream 139 is to be sent to a decoder; however, only those portions of compressed bitstream 139 that are to be used in the display are sent.

Figure 12:
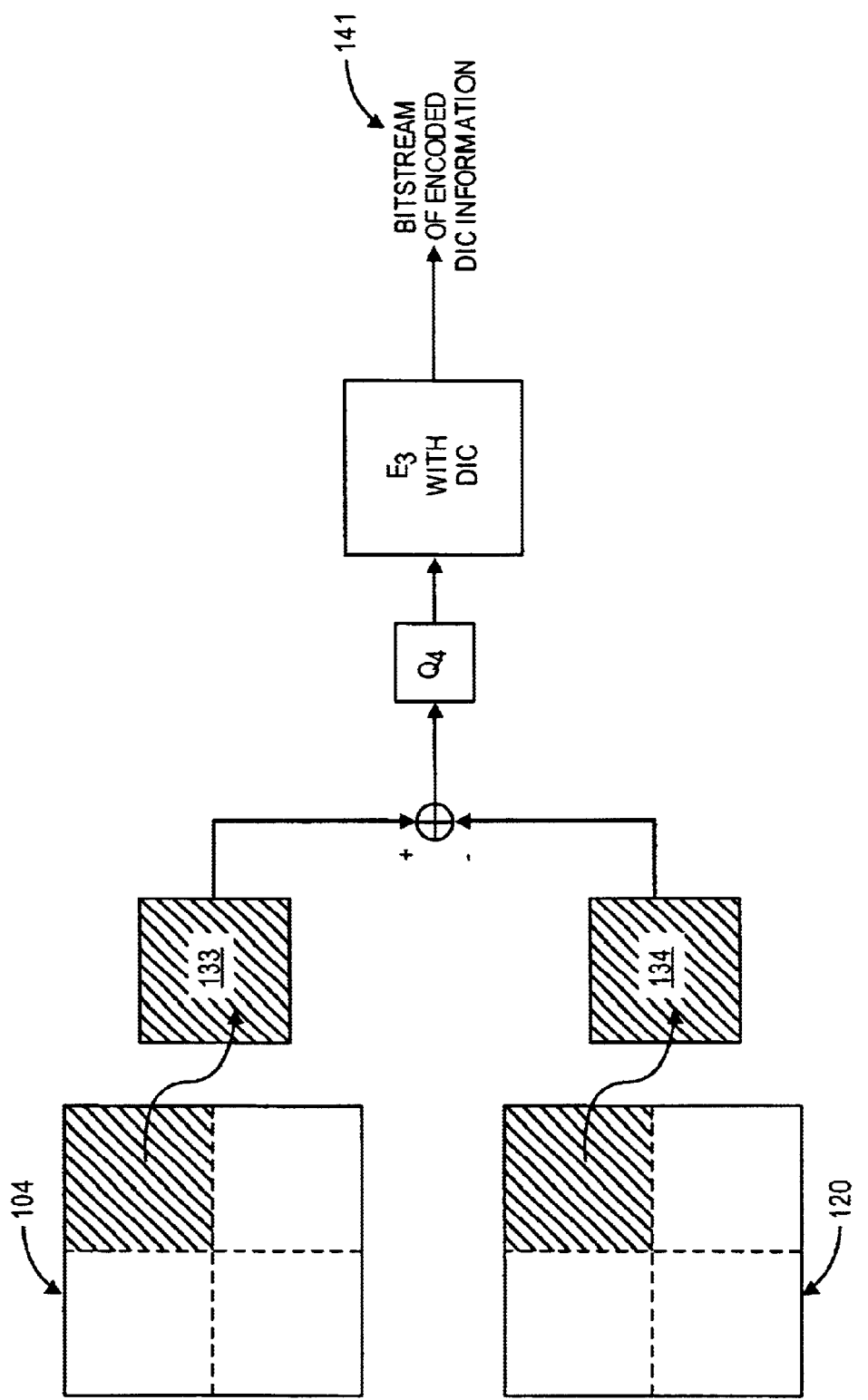
FIG. 12 illustrates an alternative embodiment of a process for encoding residual sub-tiles.
Figure 13:
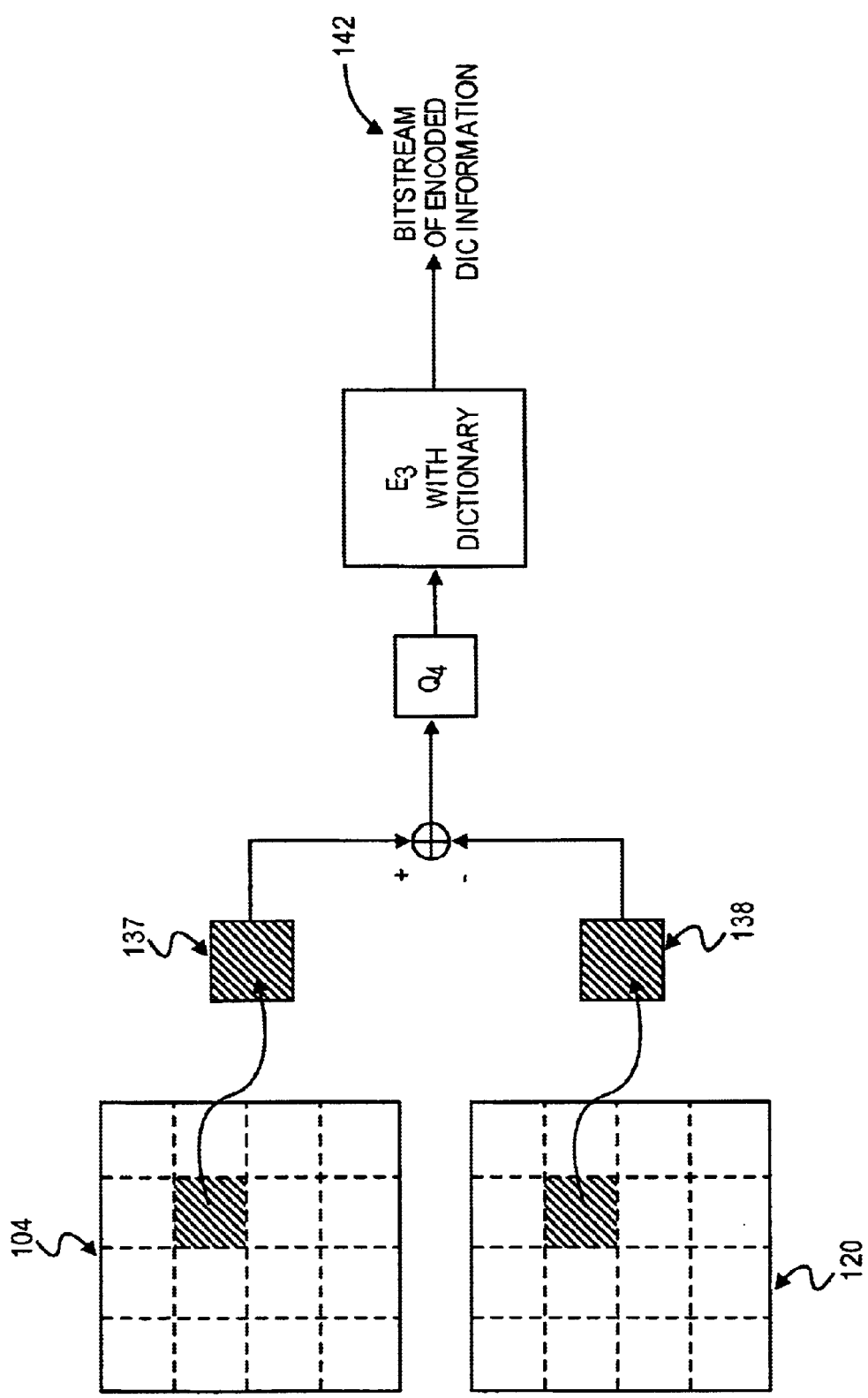
FIG. 13 illustrates an alternative embodiment of a process for encoding smaller residual image sub-tiles.

A similar process may be used for the spline-wavelet and matching pursuit embodiments (as shown in FIG. 12 and FIG. 13). Similar to earlier embodiments in FIGS. 12 and 13, encoders 136 and 140, respectively, are replaced.

FIG. 12 illustrates an alternative embodiment of a process for encoding residual image sub-tiles. Referring to FIG. 12, processing logic subtracts sub-tile 134, a sub-tile of residual image 120 (from FIG. 6), from sub-tile 133 of tile 104, the (i,j)th tile of image 101 (FIG. 1A), to create a difference image. Then processing logic performs quantization on the difference image using quantizer $Q_4$ and entropy encoding using entropy encoder $E_3$ in conjunction with a dictionary (a spline-based embodiment). The output of entropy encoder $E_3$ is a bitstream 141 of encoded dictionary information.

FIG. 13 illustrates an alternate embodiment of a process for encoding smaller residual image sub-tiles than in FIG. 12. This process may be advantageous for handheld devices. Referring to FIG. 13, the process begins by processing logic dividing each tile, tiles 104 and 120, into a number of different sub-tiles, such as 16 sub tiles, with each of the sub-tiles of 32×32. The subsequent processing is performed on all the tiles. Processing logic subtracts sub-tile 138, a sub-tile of residual image 120 (from FIG. 6), from sub-tile 137 of tile 104, the (i,j)th tile of image 101 (FIG. 1A), to create a difference image. Then processing logic performs quantization on the difference image using quantizer $Q_4$ and entropy encoding using entropy encoder $E_3$ in conjunction with a dictionary (a spline-based embodiment). The output of entropy encoder $E_3$ is a bitstream 142 of encoded dictionary information. Bitstream 142 is to be sent to a decoder; however, only those portions of compressed bitstream 142 that are to be used in the display are sent.

The decoding process is now going to be described in detail as client-side processing of the compressed data. In short, when the JPEG encoding (i.e., first alternate embodiment) is used in 112 in FIG. 4A, 118 in FIG. 6, 124 in FIG. 7, 136 in FIG. 10, and 140 in FIG. 11, JPEG decoding is used to replace 116 in FIG. 15, 151 in FIG. 17, 155 in FIG. 18, 165 in FIG. 21, and 170 in FIG. 22.

Figure 3C:
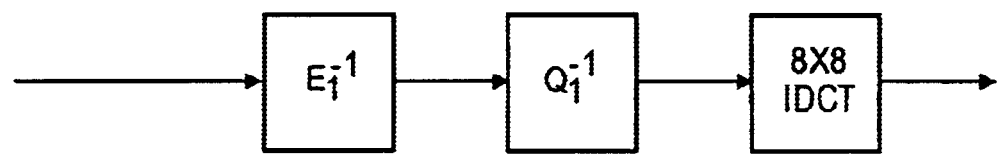
FIG. 3C illustrates a JPEG decoder.
Figure 14:
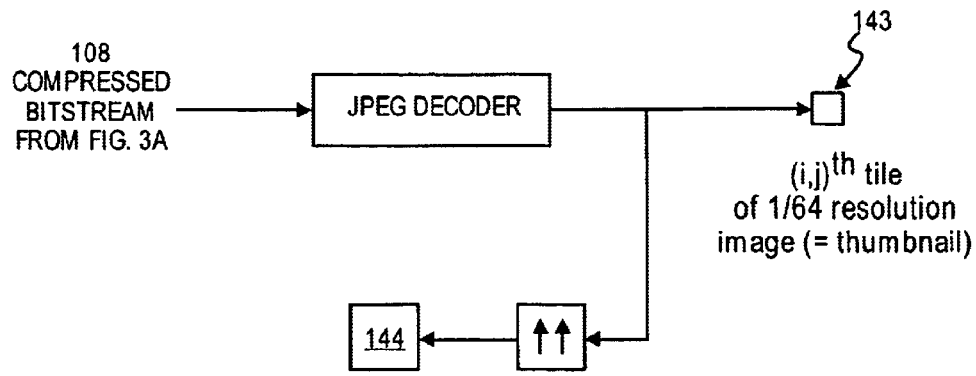

FIG. 14 is a flow diagram of one embodiment of a process of decoding thumbnail image tiles and preparing for a first level zooming-in. Referring to FIG. 14, a compressed bitstream 108 (from FIG. 3A) is decoded using JPEG decoder 1401. FIG. 3C illustrates a block diagram of the JPEG decoder, the operation and components of which are well-known in the art. The output of JPEG decoder 1401 is tile 143. Tile 143 is the (i,j)th tile of 1/64 resolution image, which in one embodiment is a thumbnail. The output of JPEG decoder 1401 is also enlarged using an enlargement process (e.g., FIG. 1B). In one embodiment, the enlargement results, image 144, is an image that is 4× the size of the input image.

One enlargement technique that may be used is discussed above in conjunction with FIG. 1B.

Figure 4C:
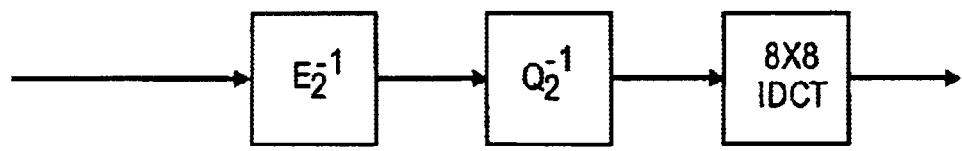
FIG. 4C illustrates a decoder from MPEG for decoding interblocks (or residuals) of P frames.
Figure 15:
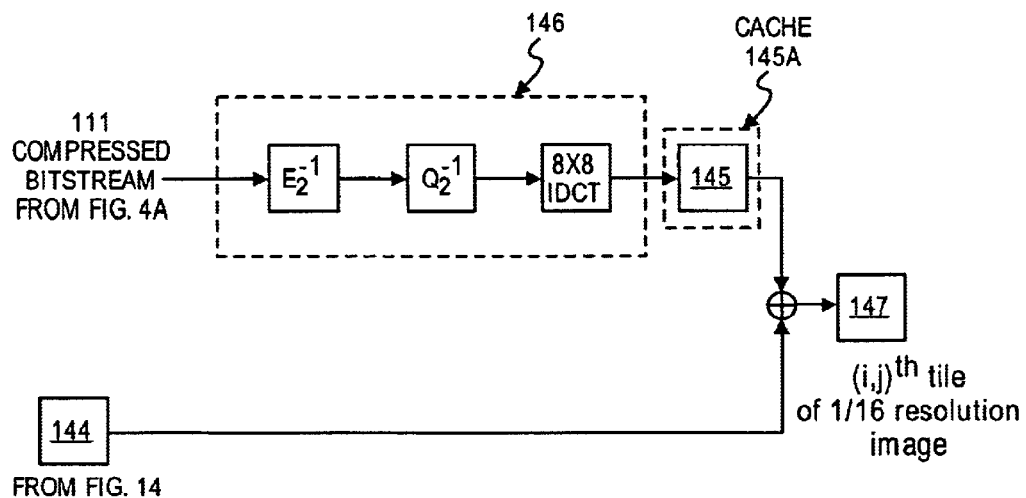

FIG. 15 illustrates one embodiment of a process for decoding 1/16 resolution image tiles for zooming-in. Referring to FIG. 15, processing logic performs decoding on compressed bitstream 111 (from FIG. 4A) using decoder 146. Decoder 146 comprises a MPEG decoder, such as shown in FIG. 4C, which is well-known in the art. The output of decoder 146, image 145, is stored in cache 145A. Decoded image 145 is added to image 144 (from FIG. 14) to create image 147. Image 147 is the (i,j)th tile of 1/16 resolution. In one embodiment, when there is insufficient cache memory, the compressed bitstream 111 is stored in cache 145A instead. In this case, the data 145 in FIG. 17 has to be decoded once more before the enlargement and addition operations are performed to give image 152.

Figure 16:
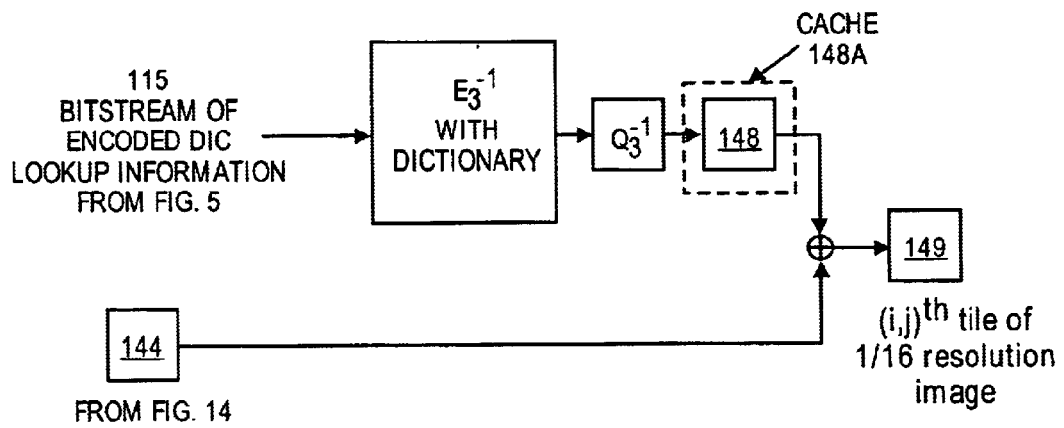
FIG. 16 illustrates an alternative embodiment of a process for decoding 1/16 resolution image tiles when encoding in FIG. 5 is used.

FIG. 16 illustrates an alternative embodiment of a process for decoding 1/16 resolution image tiles when the encoding in FIG. 5 is used. Referring to FIG. 16, processing logic performs decoding on bitstream 115 of encoded dictionary look-up information (from FIG. 5) using entropy encoder $E_3^{-1}$ and dequantizer $Q_3^{-1}$. The results of the decoding process is image 148, which is stored in cache 148A. Again, if there is insufficient cache memory, the encoded bitstream is cached and decoded once more in FIG. 19. Decoded image 148 is added to image 144 (from FIG. 14) to create image 149. Image 149 is the (i,j)th tile of 1/16 resolution.

Figure 17:
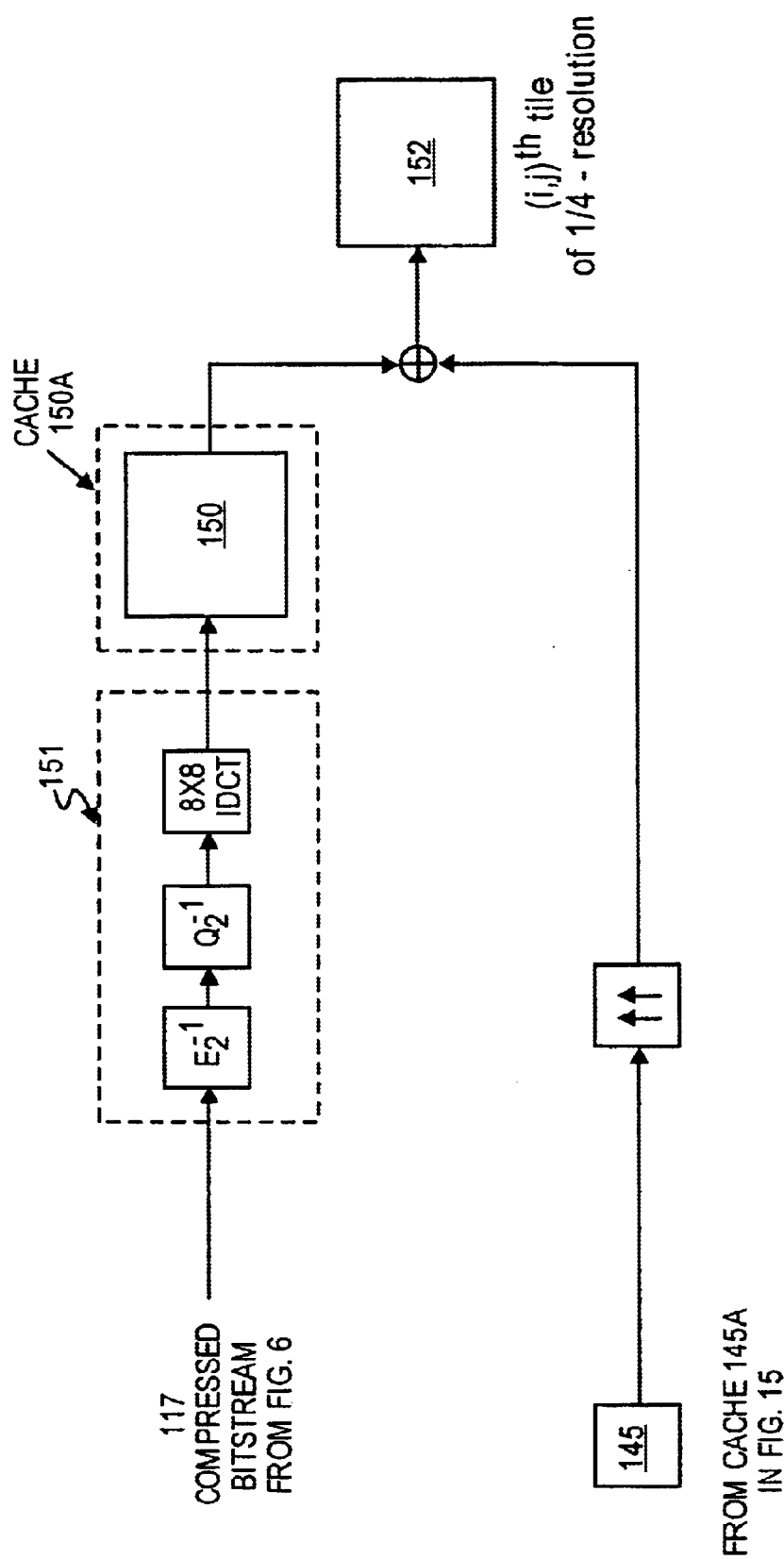
FIG. 17A illustrates one embodiment of a process for decoding of 1/4-resolution image tiles for further zooming.

FIG. 17 illustrates one embodiment of a process for decoding 1/4-resolution tiles for further zooming. Referring to FIG. 17, processing logic performs decoding on compressed bitstream 117 (from FIG. 6) using decoder 151. Decoder 1151 comprises a MPEG decoder, such as shown in FIG. 4C. The output of decoder 151, image 150, is stored in cache 150A. Again, for insufficient cache memory, the compressed bitstream is stored instead. Processing logic performs an enlargement operation (e.g., FIG. 1B) on image 145 from cache 145A (from FIG. 15). The later use of the data from the cache in this manner is referred to as data reuse. The results of the enlargement process are an enlargement of 4× to image 145. Decoded image 150 is added to the enlarged version of image 145 (from FIG. 15) to create image 152. Image 152 is the (i,j)th tile of 1/4 resolution.

Figure 18:
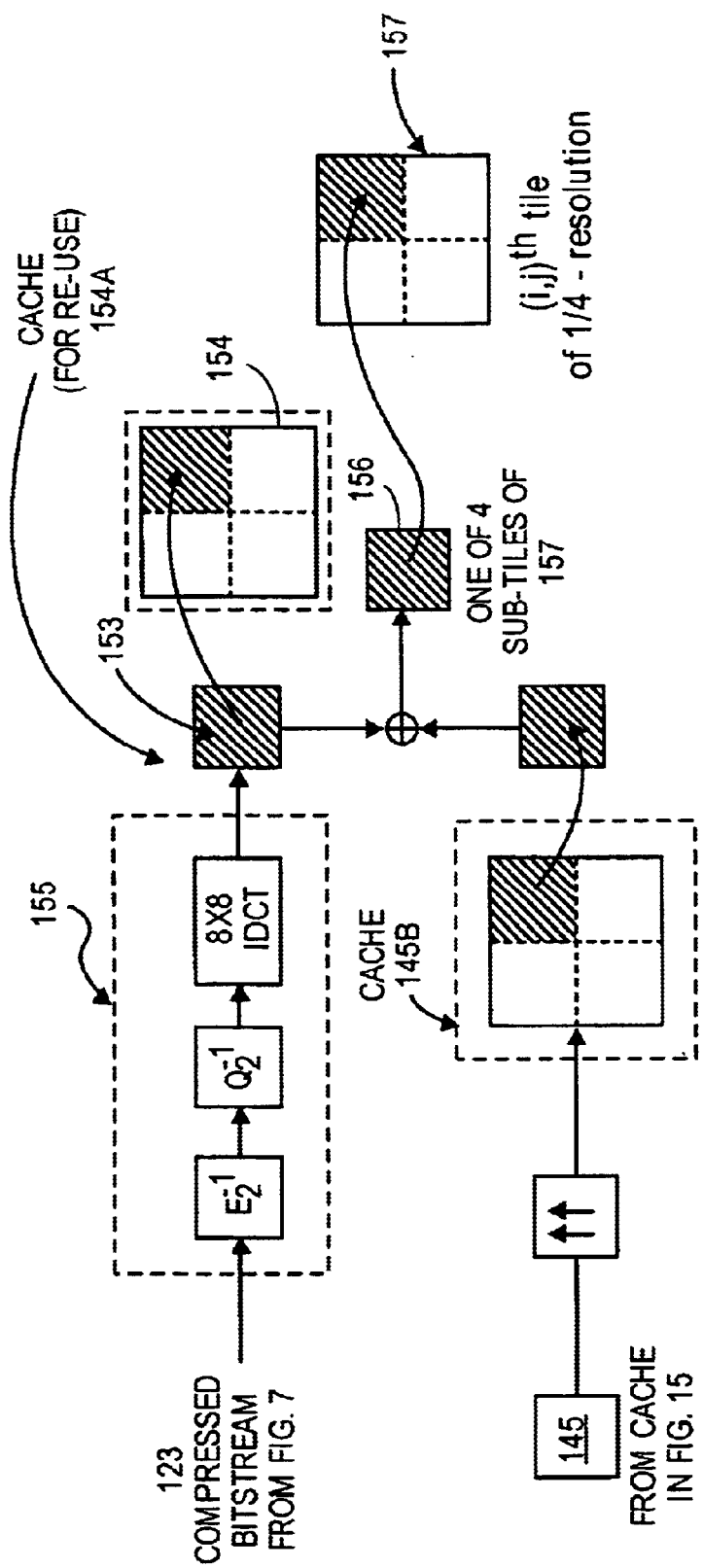
FIG. 18 illustrates one embodiment of a process for decoding of 1/4-resolution image sub-tiles when encoder in FIG. 7 is used.

FIG. 18 illustrates one embodiment of a process for decoding 1/4-resolution image sub-tiles when the encoder in FIG. 7 is used. Such an embodiment may be particularly advantageous to use in handheld devices. Referring to FIG. 18, processing logic performs decoding on compressed bitstream 123 (from FIG. 7) using decoder 155. In one embodiment, decoder 155 comprises an MPEG decoder such as shown in FIG. 4C, which is well-known in the art. The output of decoder 155 is image 153 and it is stored in cache 154A as part of tile 154. Again, if there is insufficient cache memory, the compressed bitstream of this particular sub-tile is stored in cache 154A instead. In this case, the sub-tile in image 154B is obtained by applying decoder 155 again.

Processing logic performs an enlargement operation (e.g., FIG. 1B) on image 145 from cache 145A in FIG. 15. The enlargement operation results in an enlarged version of image 145 that is 4× the size of image 145. The enlarged image is cached in cache 145B. Of course, this is replaced by the corresponding compressed bitstream if there is insufficient cache memory.

In an alternative embodiment, the enlargement of image 145 may occur after dividing the tile in cache 145B.

Processing logic adds the enlarged image from cache 145B to image 153 to create image 156 or decoding the corresponding bitstream is required if there is not enough cache memory. Image 156 represents one of four sub-tiles of image 157, while image 157 is the (i,j)th tile of 1/4-resolution.

Figure 19:
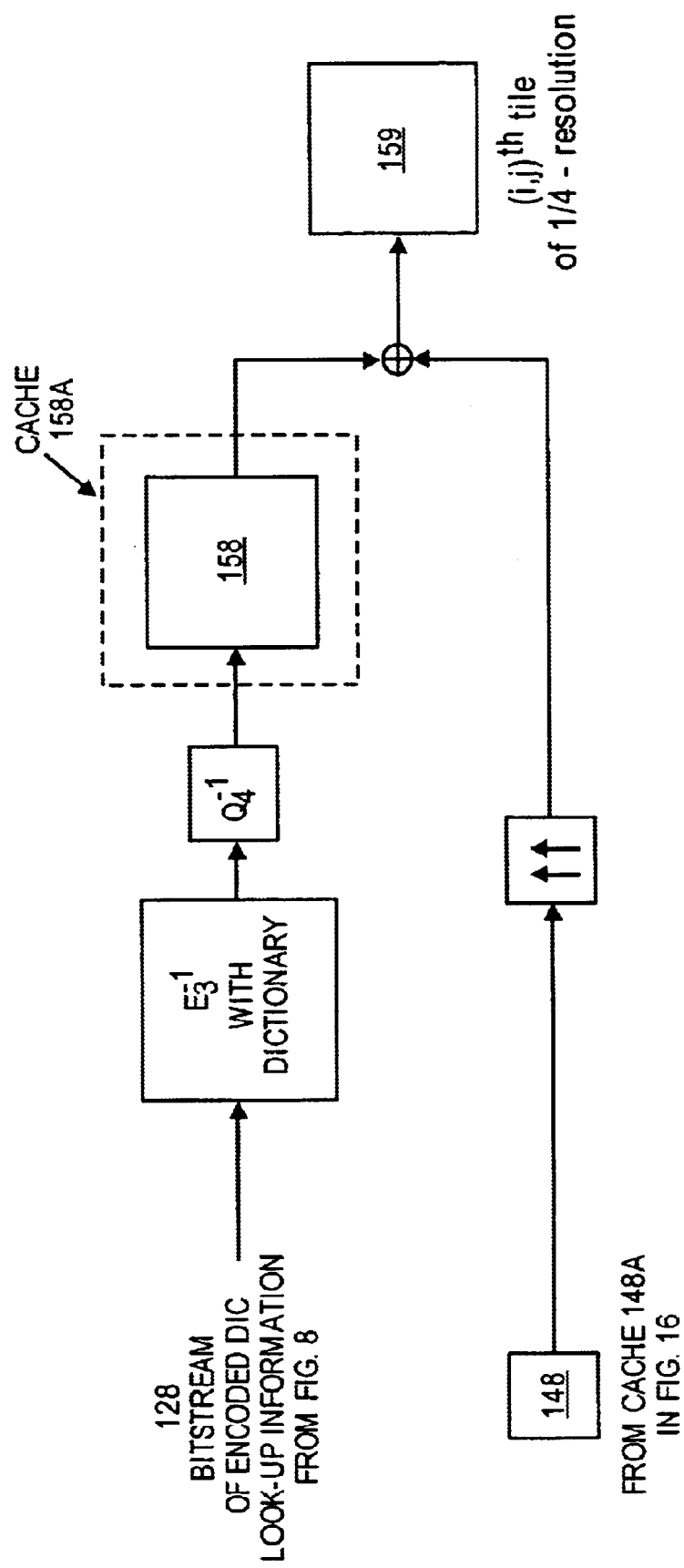
FIG. 19 illustrates an alternative embodiment of a process for decoding image tiles when encoder in FIG. 8 is used.

FIG. 19 illustrates an alternative embodiment of a process for decoding image tiles when the encoder in FIG. 8 is used. This embodiment may be advantageous for use on a PC. Referring to FIG. 19, processing logic performs decoding on bitstream 115, which includes encoded dictionary lookup information (from FIG. 5), using entropy decoder $E_3^{-1}$ and dequantizer $Q_4^{-1}$. The results of the decoding process is image 158, which is stored in cache 158A, or the corresponding compressed bitstream is stored instead.

Figure 20:
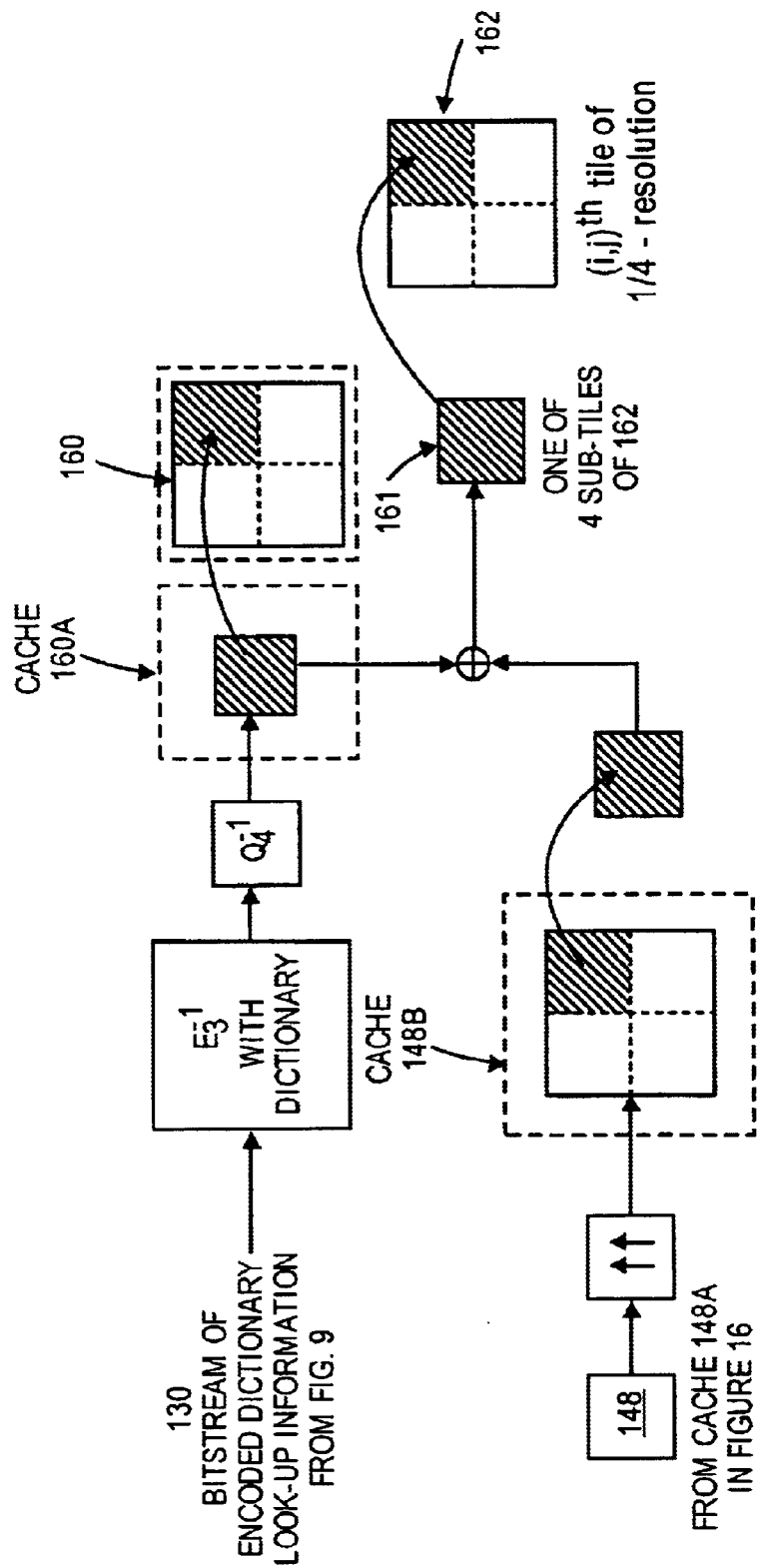
FIG. 20 illustrates an alternative embodiment of a process for decoding image sub-tiles when encoder in FIG. 9 is used.

Processing logic performs an enlargement operation (e.g., FIG. 1B) on image 145 from cache 148A (from FIG. 16). The later use of the data from the cache in this manner is referred to as data reuse. The results of the enlargement process are an enlargement of 4× to image 148. Decoded image 158 is added to the enlarged version of image 148 (from FIG. 15) to create image 159. Image 159 is the (i,j)th tile of 1/4 resolution FIG. 20 illustrates an alternative embodiment of a process for decoding image sub-tiles when the encoder in FIG. 9 is used. Referring to FIG. 20, processing logic performs decoding on bitstream 130, which includes encoded dictionary lookup information (from FIG. 9), using entropy encoder $E_3^{-1}$ and dequantizer $Q_4^{-1}$. The results of the decoding process is image 158, which is stored in cache 158A as part of tile 160.

Processing logic performs an enlargement operation (e.g., FIG. 1B) on image 148 from cache 148A in FIG. 16. The enlargement operation results in an enlarged version of image 148 that is 4× the size of image 148. The enlarged image is cached in cache 148B. Processing logic adds the enlarged image from cache 148B to image 158 to create image 161. Alternatively, the corresponding compressed bitstream is decoded again before this process is carried out. Image 161 represents one of four sub-tiles of image 162, while image 162 is the (i,j)th tile of 1/4-resolution.

It should be noted that cache 158A does not have to be used if memory resources are low. In such a case, the enlarged image would combined with image 158 sooner.

Figure 21:
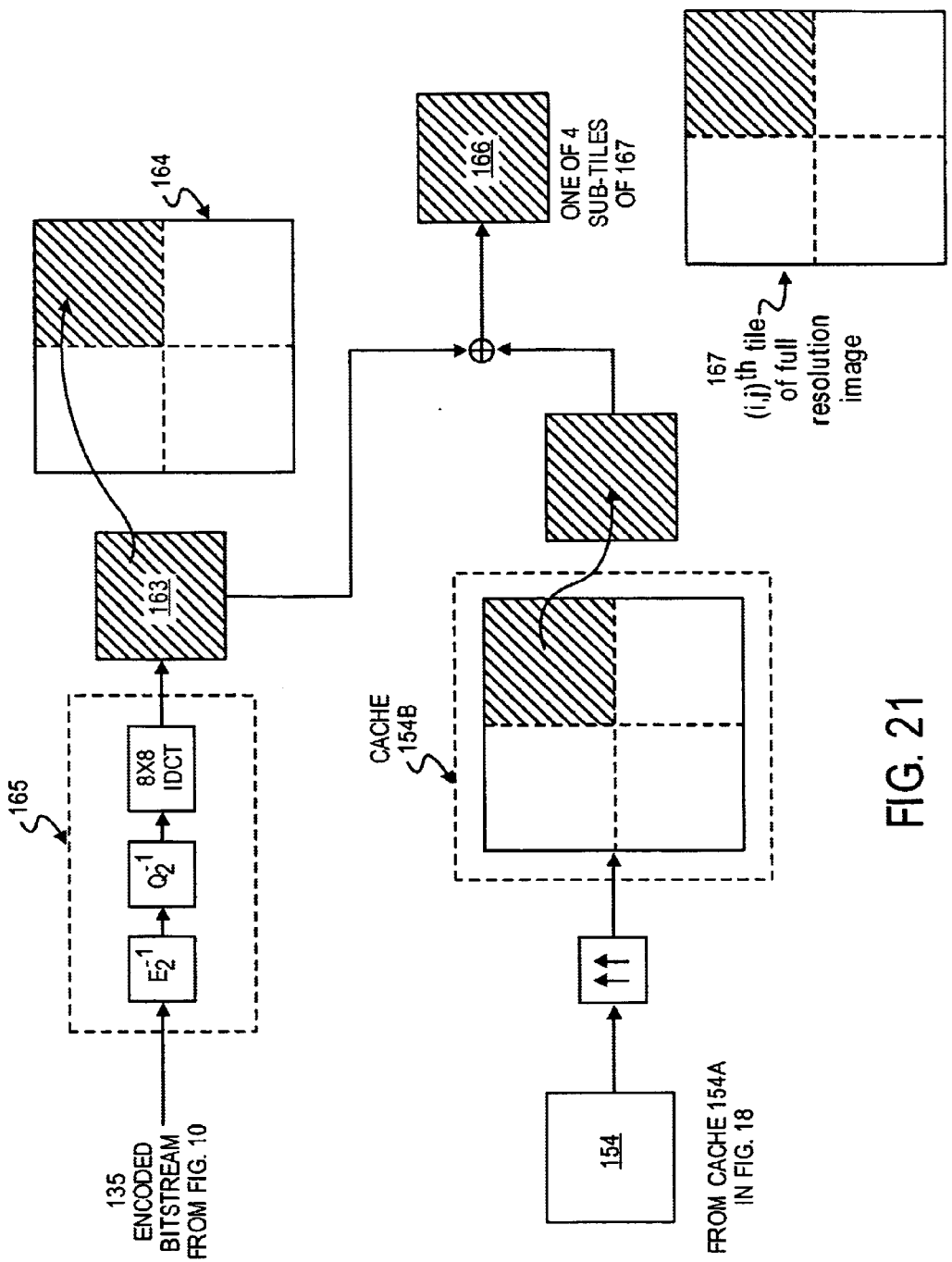
FIG. 21 illustrates one embodiment of a process for decoding of sub-tiles of full image resolution.

FIG. 21 illustrates one embodiment of a process for decoding sub-tiles of a full image resolution. Referring to FIG. 21, processing logic performs decoding on compressed bitstream 135 (from FIG. 10) using decoder 165. In one embodiment, decoder 165 comprises an MPEG decoder such as shown in FIG. 4C, which is well-known in the art. The output of decoder 165 is image 163 and it is stored in cache 163A as part of tile 164. Alternatively, the corresponding compressed bitstream is stored instead.

Processing logic performs an enlargement operation (e.g., FIG. 1B) on image 154 from cache 154A in FIG. 18. The enlargement operation results in an enlarged version of image 154 that is 4× the size of image 154. The enlarged image is cached in cache 154B as part of a tile. In an alternative embodiment, the enlargement process may occur after an image in cache 154B is divided. In a further embodiment, a compressed bitstream is decoded before the enlargement process is carried out.

Processing logic adds the enlarged image from cache 154B to image 163 to create image 166. Image 166 represents one of four sub-tiles of image 167, while image 167 is the (i,j)th tile of a full resolution image.

Note again that for a personal computer, cache 154B would not be necessary and the combining of images could occur as soon as the enlargement operation ends.

Figure 22:
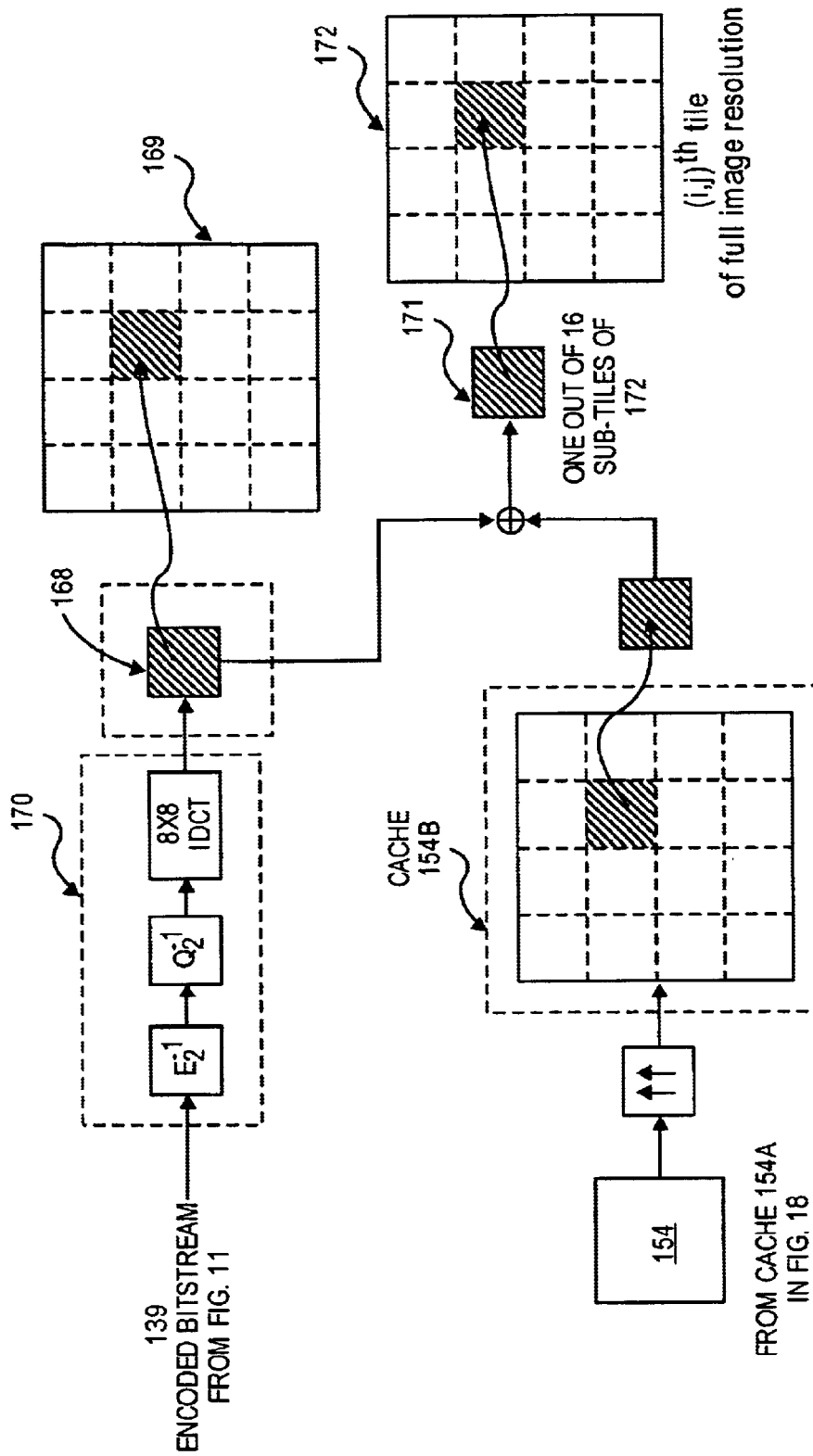
FIG. 22 illustrates one embodiment of a process for decoding of smaller sub-tiles of full image resolution.

FIG. 22 illustrates one embodiment of a process for decoding smaller sub tiles of a full image resolution. Referring to FIG. 22, processing logic performs decoding on compressed bitstream 139 (from FIG. 11) using decoder 170. In one embodiment, decoder 170 comprises an MPEG decoder such as shown in FIG. 4C, which is well-known in the art. The output of decoder 170 is image 168 and it is stored in cache 168A as one sub-tile of tile 169. Alternatively, image 139 is stored instead.

Processing logic performs an enlargement operation (e.g., FIG. 1B) on image 154 from cache 154A in FIG. 18. The enlargement operation results in an enlarged version of image 154 that is 4× the size of image 154. The enlarged image is cached in cache 154B as part of a tile. In an alternative embodiment, the enlargement process may occur after an image in cache 154B is divided.

Processing logic adds the enlarged image of the sub-tile from cache 154B to image 163 to create image 171. Image 171 represents one of four sub-tiles of image 172, while image sub-tile 167 is the (i,j)th tile of a full resolution image. In one embodiment, image sub-tile 167 is one of 16 sub-tiles of tile 172.

Note again that for a personal computer, cache 154B would not be necessary and the combining of images could occur as soon as the enlargement operation ends.

Figure 23:
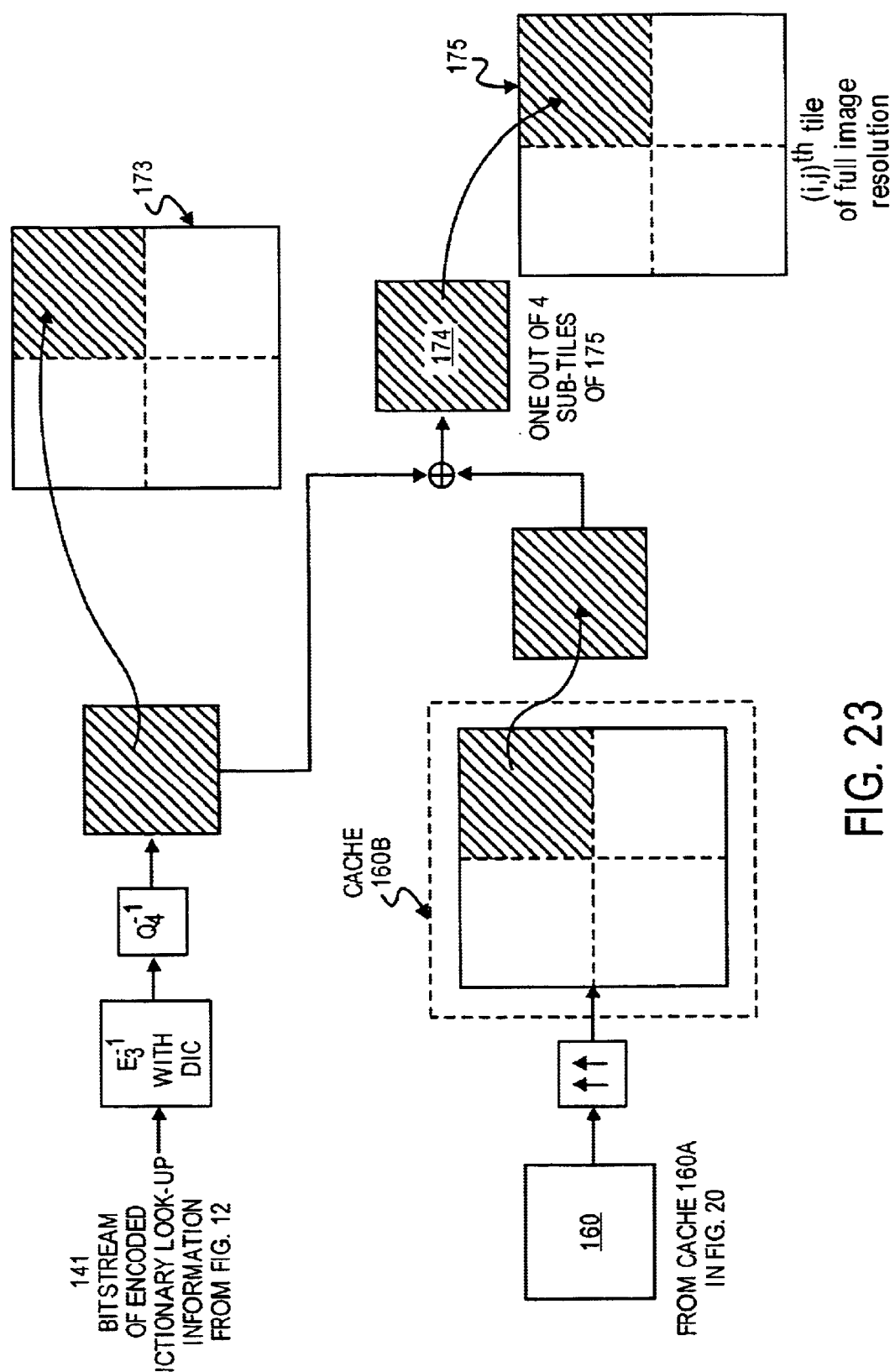
FIG. 23 illustrates an alternative embodiment of a process for decoding sub-tiles of full image resolution when encoding in FIG. 12 is used.

FIG. 23 illustrates an alternative embodiment of a process for decoding sub tiles of a full image resolution when the encoding in FIG. 12 is used. Referring to FIG. 23, processing logic performs decoding on bitstream 141, which includes encoded dictionary lookup information (from FIG. 12), using entropy encoder $E_3^{-1}$ and dequantizer $Q_4^{-1}$. The results of the decoding process is image 158, which is stored in cache 158A as part of tile 173.

Processing logic performs an enlargement operation (FIG. 1B) on image 160 from cache 160A in FIG. 20. The enlargement operation results in an enlarged version of image 160 that is 4× the size of image 160. The enlarged image is cached in cache 160B as part of a tile. In alternative embodiment, the enlargement process may occur after an image in cache 160B is divided.

Processing logic adds the enlarged image from cache 160B to image 168 to 8; create image 174. Image 174 represents one of four sub-tiles of image 175, while image 175 is the (i,j)th tile of a fill resolution image.

Note again that for a personal computer, cache 160B would not be necessary and the combining of images could occur as soon as the enlargement operation ends.

Figure 24:
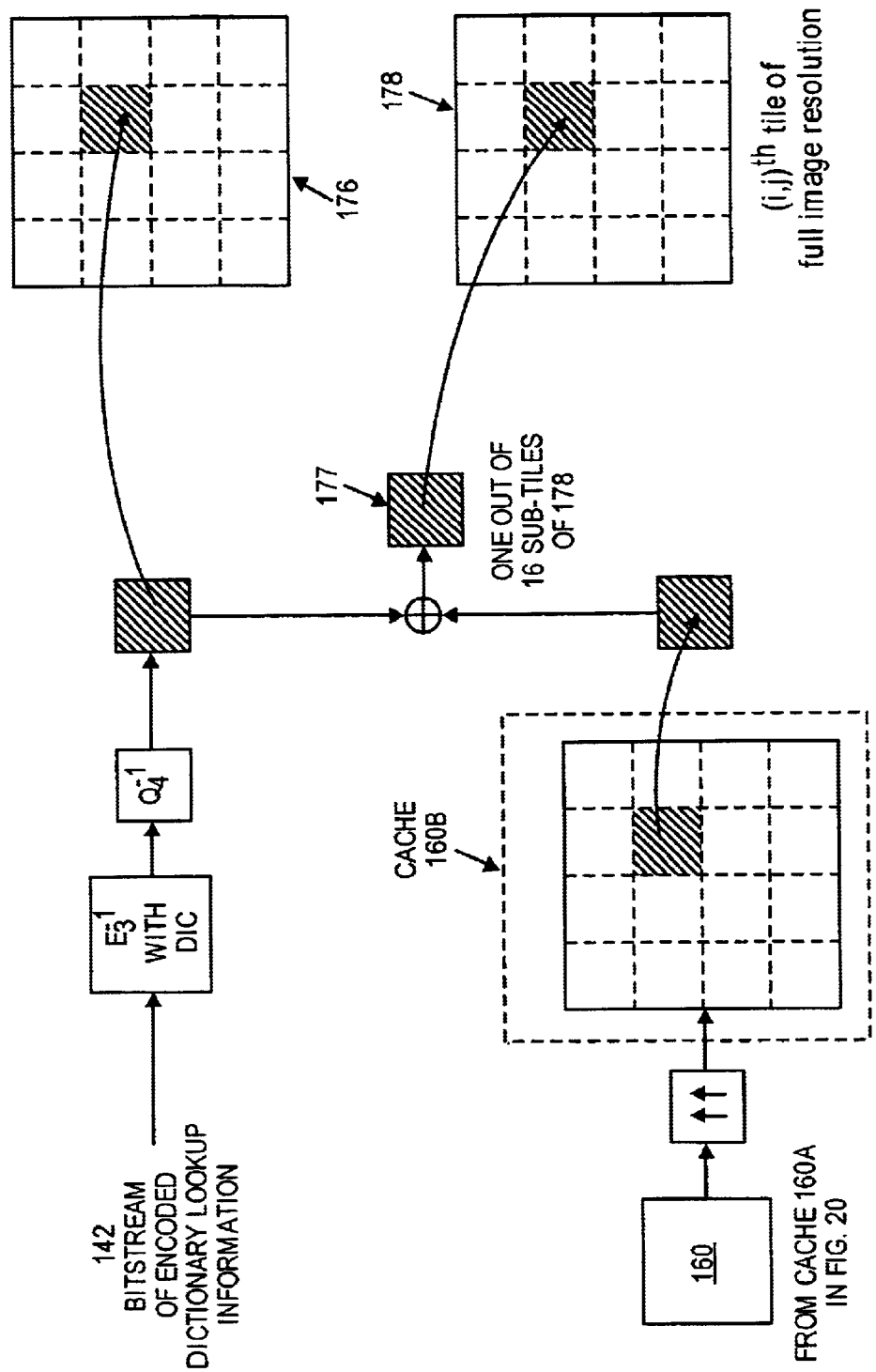
FIG. 24 illustrates an alternative embodiment of a process for decoding smaller sub-tiles of full image resolution when encoding from FIG. 13 is used.

FIG. 24 illustrates an alternative embodiment of a process for decoding smaller sub-tiles of a full image resolution when the encoding in FIG. 13 is used. Referring to FIG. 24, processing logic performs decoding on bitstream 142, which includes encoded dictionary lookup information (from FIG. 12), using entropy encoder $E_3^{-1}$ and dequantizer $Q_4^1$. The results of the decoding process is image 180, which is part of tile 176.

Processing logic performs an enlargement operation (e.g., FIG. 1B) on image 160 from cache 160A in FIG. 20. The enlargement operation results in an enlarged version of image 160 that is 4× the size of image 160. The enlarged image is cached in cache 160B as part of a tile. In an alternative embodiment, the enlargement process may occur after an image in cache 160B is divided.

Processing logic adds the enlarged image from cache 160B to image 168 to create image 177. Image 177 represents one of sixteen sub-tiles of image 178, while image 178 is the (i,j)th tile of a full resolution image.

Note again that for a personal computer, cache 160B would not be necessary and the combining of images could occur as soon as the enlargement operation ends.

Note that the data re-use components (from the cache in the embodiments above) in the decoding process.

Figure 26:
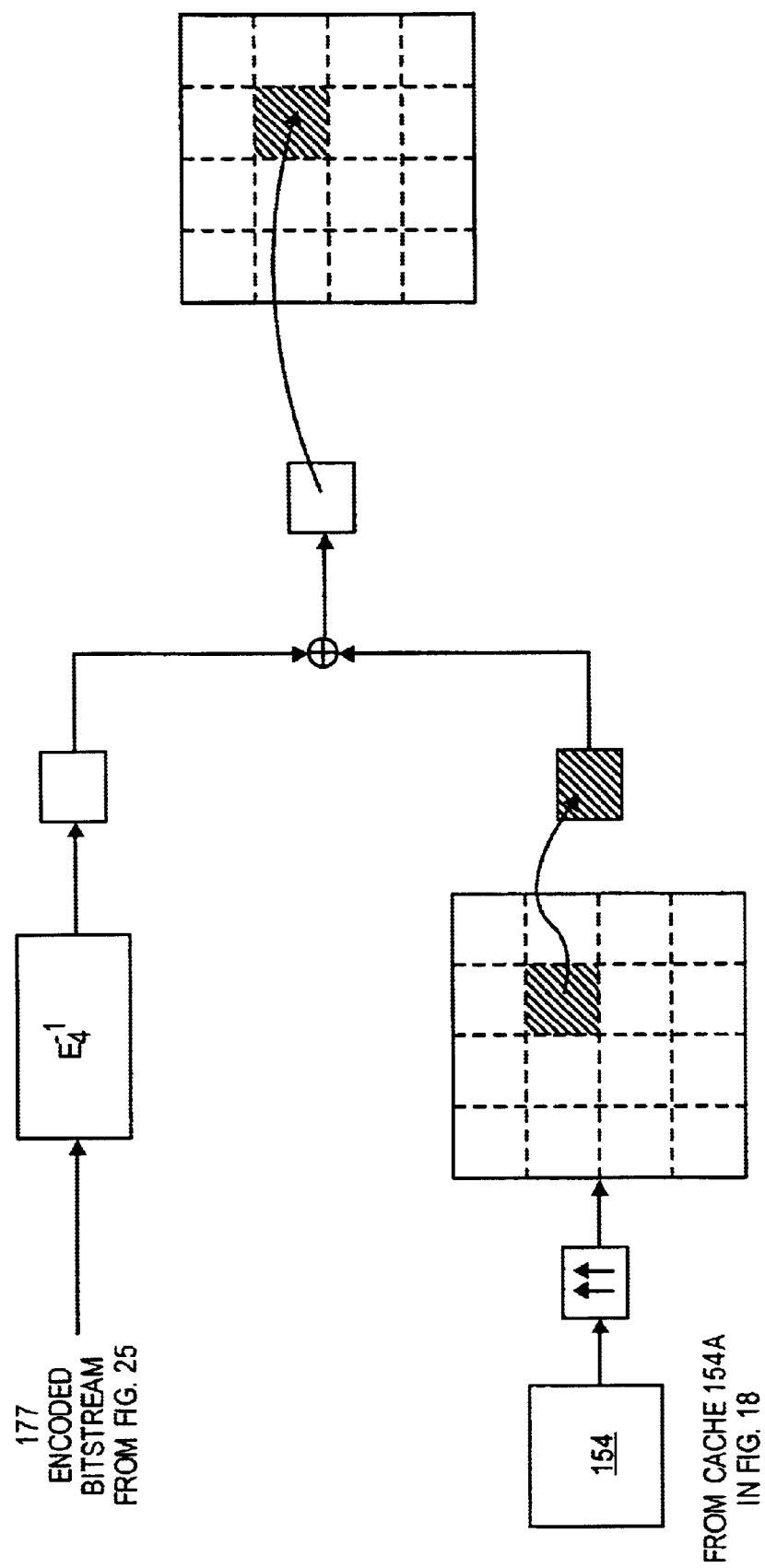
FIG. 26 illustrates lossless decoding of subtiles of a $(i,j)^{th}$-tile of an image.

To perform lossless encoding or process ROIs, the DCT and quantization are not performed on those tiles that contain the ROI. Instead, they are replaced by other lossless compression techniques, such as JPEG lossless Mode (=DPCM) etc., again on those tiles that contain ROI. This is shown in FIG. 25 in which encoder $E_4$ is a reversible (or lossless) encoder (e.g., DPCM in JPEG lossless encoder). The corresponding decoder is shown in FIG. 26 in which decoder $E_4^{-1}$ is the inverse of encoder $E_4$.

Note that the encoding process is not limited to downsizing only one or two times and only having one or two residual images. In other words, the encoding process may downsize images more than two times and may produce more than two residual images.

Figure 27:
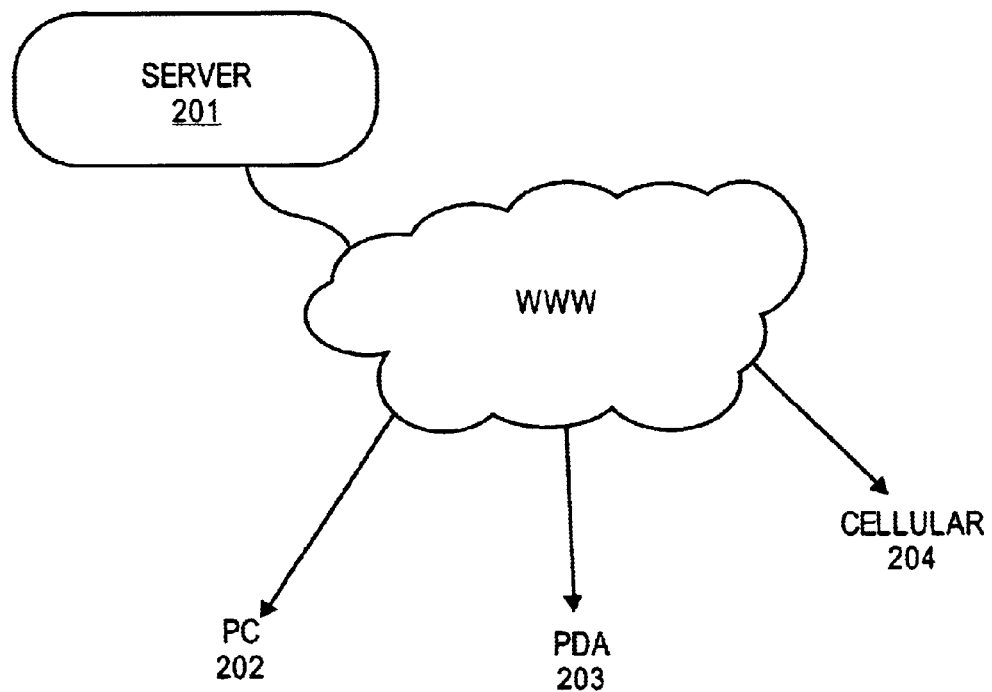
FIG. 27 illustrates one embodiment of a system in which encoded images are shown.
Figure 28:
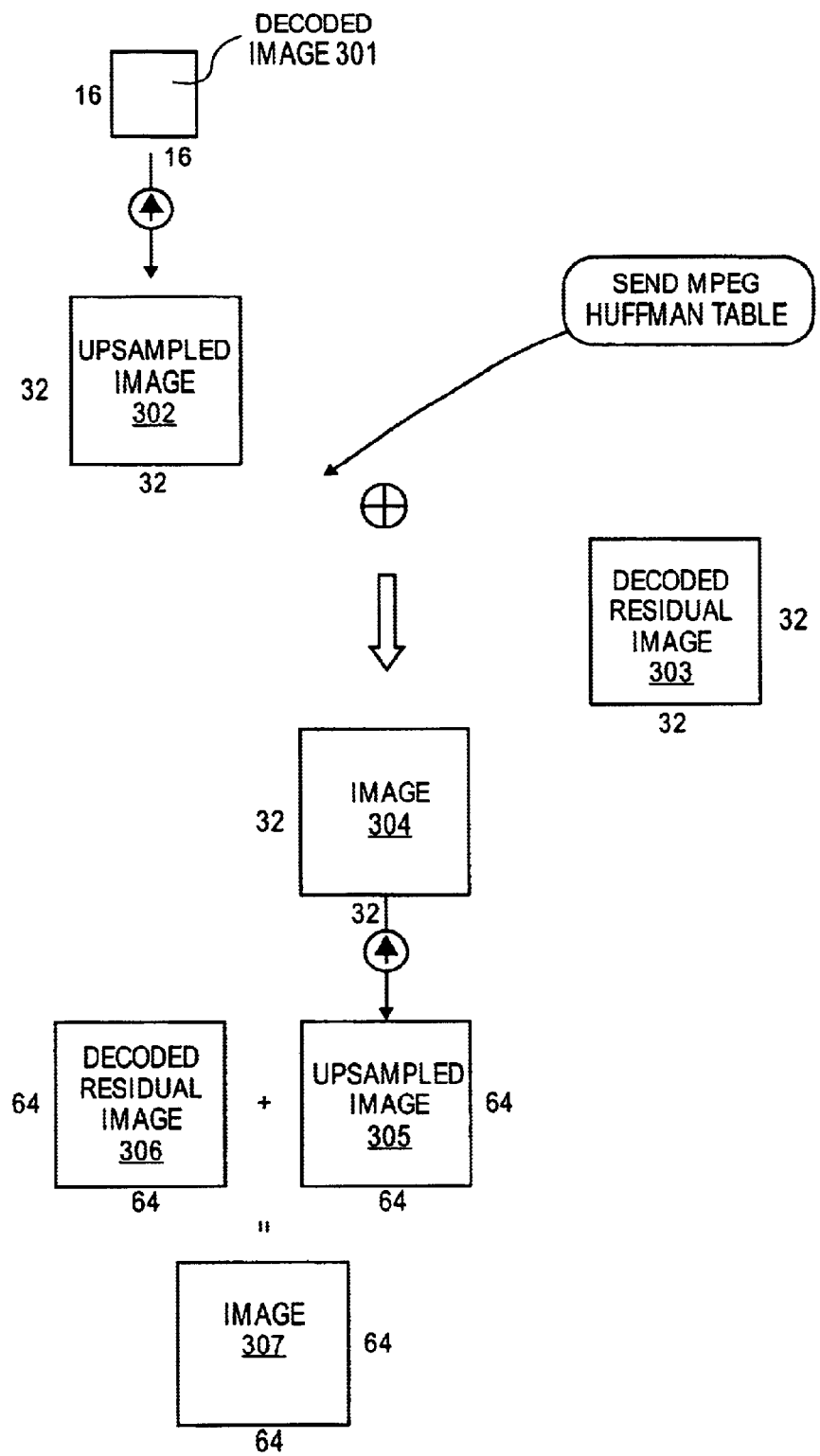
FIG. 28 illustrates one embodiment of the decoding process.

The encoded images may be sent as an encoded bitstream to a variety of devices on which one or more versions of the image of different size may be displayed. One embodiment of a system in which such encoded image tiles are shown in FIG. 27. Referring to FIG. 27, a server stores the encoded versions of downsized image tile, a first residual image tile and a second residual image tile (and any other residual image tiles) and sends the compressed bitstreams to either PC 202, PDA 203, or cellular device 204 through the World Wide Web or some other networked environment. Note that other types of devices and networks, such as, for instance, as described below may be used.

In one embodiment, server 201 sends the encoded version of the downsized image first followed by the encoded version of the first residual image and then the encoded version of the second residual image. If server 201 is aware of the display limitations of the device requesting the encoded image stream, server 201 may only send a portion of the encoded image stream (e.g., that portion of the image stream that is needed to create an image for the display of that size).

Once the encoded image bitstream is received by the client, the client may decode the image bitstream using a decoder and display the image. One embodiment of an exemplary decoding process is illustrated in FIG. 26. Referring to FIG. 26, the downsized image 301 may comprise a thumbnail image. The client uses a decoder to decode the encoded image to create a 16 pixel×16-pixel image. In one embodiment, the encoded image is decoded using a JPEG decoder to create the 16-pixel×16-pixel image.

Thereafter, the downsized image tile is enlarged by an enlargement technique to create a 32-pixel×32-pixel image. An encoded residual image, is decoded using a decoder (e.g., a JPEG decoder that uses an MEG Huffman table) to create 32-pixel×32 pixel decoded residual image 303. Enlarged image 302 is combined with the decoded residual image 303 to create image 304.

Image 304 may be displayed based on the available display size. If a display size permits, image 304 may be enlarged to create upsampled image 305. In one embodiment, enlarged image 305 is a 32-pixel×32-pixel image. The client may also decode another encoded version of a residual image, such as residual image 104, to create a 64-pixel×64-pixel decoded residual image 306. The decoded residual image 306 is added to enlarged image 305 to create image 307, which represents a 64-pixel×64-pixel image.

In one embodiment, the client already has the MPEG Huffman table stored locally or has some other mechanism to access it. In an alternative embodiment, the MPEG Huffman table is sent with the encoded image stream. In one further embodiment, the decoding occurs with a native JPEG decoder without the use of an MPEG Huffman table. In such a case, clearly the quality of the displayed image would not be as great as that if used with the MPEG Huffman table.

Applications

The techniques described herein may be used in a number of applications. Some exemplary applications include an emergency room/hospital for medical imaging/diagnosis and child care centers. In each of these cases, a digital camera (or cameras) at these locations captures images and includes the necessary functionality to encode the captured images. Alternatively, the images may be sent to a computer system where they are encoded. Once encoded, the images may be available to review at remote locations as long as the decoding functionality described above is available. For example, if an individual had a cellular phone or a personal digital assistant (PDA) with the decoding capability described herein, that individual could review the images.

Buttons and other inputs devices such as, for example, but not limited to, stylus devices, may be used to select images and imaging options such as panning and/or zooming. The processing of sub-tiles described above is of particular usefulness where tiles overlap with the display window. That is, the use of sub-tiles allows portions of the files to be processed and combined to create the image for the display window of a device such as a PDA, cell phone, etc. In such a case, the operation of panning would cause the system to identify the relevant tile portions to create the image being visualized. In the case of zooming, as the view zooms in further more residual images are used.

Note that for medical imaging and other applications in which the detail in the image is of particular importance, lossless tiles and processing as described above may be employed.

An Exemplary Data Management System

One embodiment of a data management system that may be used to implement the techniques described below. A similar data management system may be used such as the data management system described in U.S. patent application Ser. No. 09/687,467, entitled "Multi-resolution Image Data Management System and Method Based on Tiled Wavelet-Like Transform and Sparse Data Coding," filed Oct. 12, 2000, assigned to the corporate assignee of the present invention, except with the transform described above.

The present invention may be implemented in a variety of devices that process images, including a variety of computer systems, ranging from high end workstations and servers to low end client computers as well as in application specific dedicated devices, such as personal digital assistants (PDA)s and cellular phones.

System for Encoding and Distributing Multi-Resolution Images

Figure 29:
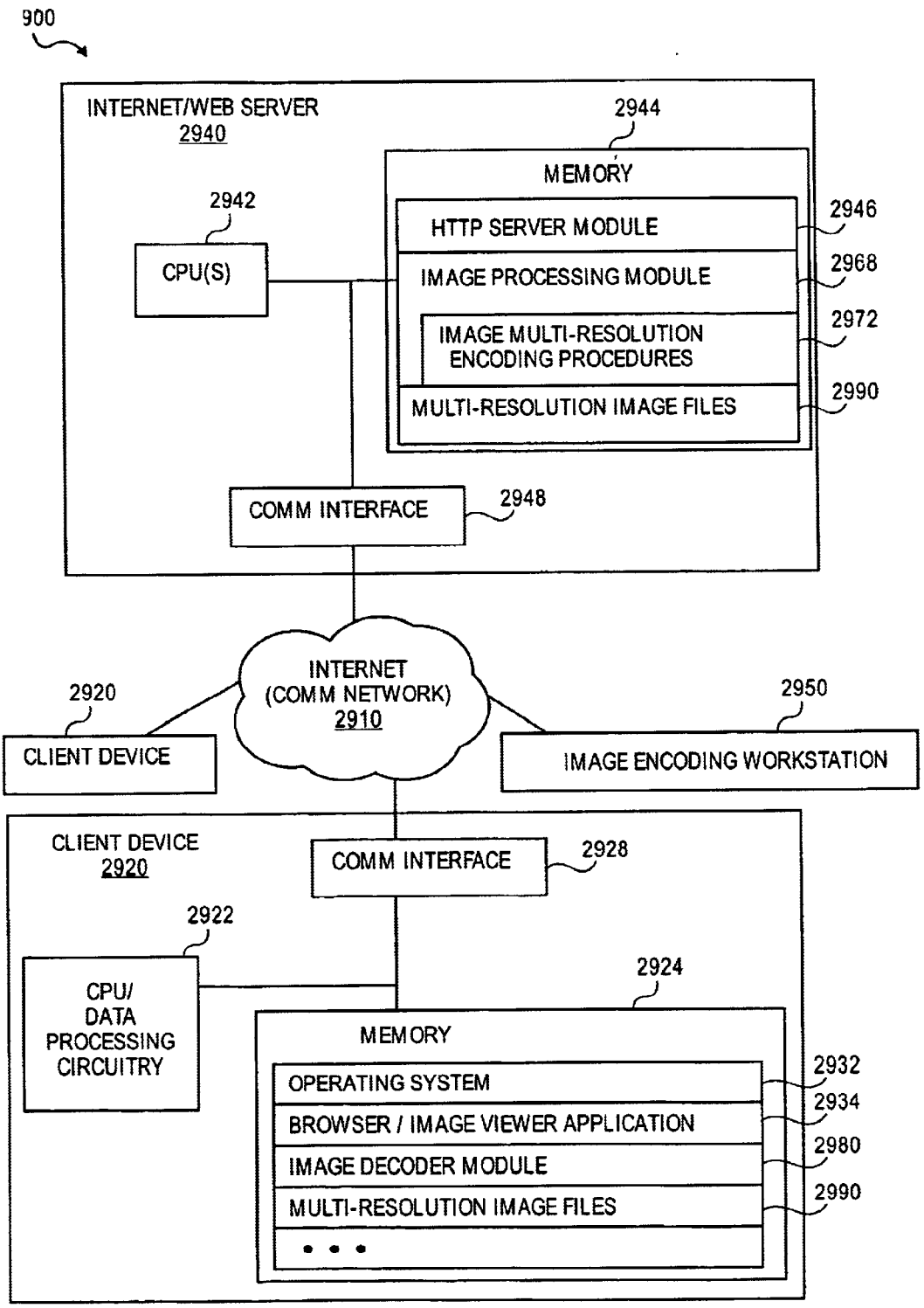
FIG. 29 is a block diagram of one embodiment of a network environment.

FIG. 29 shows a distributed computer system, including a web server 2940 and a number of client computers 2920 for distributing, multi-resolution images 2990 to the client computers via a global communications network 2910, such as the Internet, or any other appropriate communications network, such as a wired or wireless local area network or an Intranet. An imaging encoding workstation 2950 prepares multi-resolution image files for distribution by the web server. In some embodiments, the web server 2940 may also perform the image encoding tasks of the image encoding workstation 2950.

A typical client device 2920 will be a personal digital assistant, cellular or other wireless phone, personal computer workstation, or a computer controlled device dedicated to a particular task. The client device 2920 will preferably include a central processing unit 2922, memory 2924 (including high speed random access memory and non-volatile memory such as disk storage) and a network interface or other communications interface 2928 for connecting the client device to the web server via the communications network 2910. The memory 2924, will typically store an operating system 2932, a browser application or other image viewing application 2934, an image decoder module 2980, and multi-resolution image files 2990 encoded in accordance with the present invention. In one embodiment, the browser application 2934 includes or is coupled to a Java® (trademark of Sun Microsystems, Inc.) virtual machine for executing Java language programs, and the image decoder module is implemented as a Java® applet that is dynamically downloaded to the client device along with the image files 2990, thereby enabling, the browser to decode the image tiles for viewing.

The web server 2940 will preferably include a central processing unit 2942, memory 2944 (including high speed random access memory, and non-volatile memory such as disk storage), and a network interface or other communications interface 2948 for connecting the web server to client devices and to the image encoding workstation 2950 via the communications network 2910. The memory 2941 will typically store an http server module 2946 for responding to http requests, including request for multi-resolution image files 2990.

The web server 2940 may optionally include an image processing module 2968 with encoding procedures 2972 for encoding images as multi-resolution images.

An Exemplary Computer System

Figure 30:
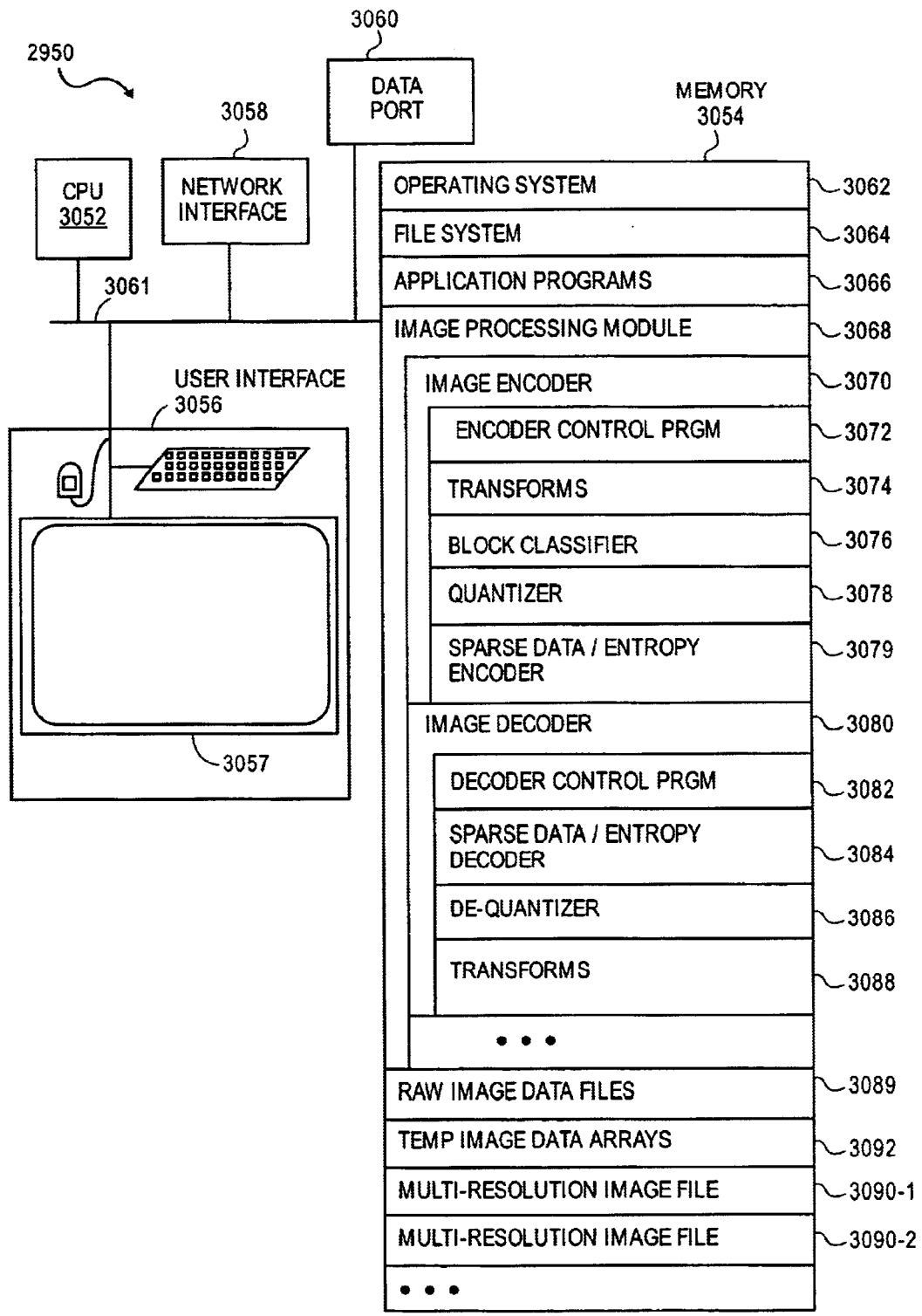
FIG. 30 is a block diagram of an exemplary computer system.

Referring to FIG. 30, the image processing workstation 2950 may be implemented using a programmed general-purpose computer system. FIG. 30 may also represent the web server, when the web server performs image processing tasks. The computer system 2950 may include:

- one or more data processing units (CPUs) 3052;
- memory 3054 which will typically include both high speed random access memory, as well as non-volatile memory;
- user interface 3056 including a display device 3057 such as a CRT or LCD type display;
- a network or other communication interface 3058 for communicating with other computers as well as other devices:
- data port 3060, such as for sending and receiving images (although such image transfers might also be accomplished via the network interface 3058); and
- one or more communication buses 3061 for interconnecting the CPU(s) 3052, memory 3054, user interface 3056, network interface 3058 and data port 3060.

The computer system's memory 3054 stores procedures and data, typically including:

- an operating system 3062 for providing basic system services;
- a file system 3064, which may be part of the operating system;
- application programs 3066, such as user level programs for viewing and manipulating images;
- an image processing module 3068 for performing various image processing functions including those that are described herein;
- image files 3090 representing various images; and
- temporary image data arrays 3092 for intermediate results generated during image processing and image regeneration.

The computer 2950 may also include a http server module 3046 (FIG. 29) when this computer 2950 is used both for image processing and distribution of multi-resolution images. The image processing module 3068 may include an image encoder module 3070 and an image decoder module 3080. The image encoder module 3070 produces multi-resolution image files 3090, the details of which are discussed above. The image encoder module 3070 may include:

- an encoder control program 3072 which controls the process of compressing and encoding an image (starting with a raw image array 3089, which in turn may be derived from the decoding of an image in another image file format),
- a set of transform procedures 3074 for applying filters to image data representing an image;
- a block classifier procedure 3076 for determining the quantization divisors to be applied to each block (or band) of transform coefficients for an image;
- a quantizer procedure 3078 for quantizing the transform coefficients for an image; and
- a sparse data encoding procedure 3079, also known as an entropy encoding procedure, for encoding the quantized transform coefficients generated by the quantizer procedure 3078.

The procedures in the image processing module 3068 store partially transformed images and other temporary data in a set of temporary data arrays 3092.

The image decoder module 3080 may include:

- a decoder control program 3082 for controlling the process of decoding an image file (or portions of the image file) and regenerating the image represented by the data in the image file;
- a sparse data decoding procedure 3084 for decoding the encoded, quantized transform coefficients stored in an image file into a corresponding array of quantized transform coefficients;
- a de-quantizer procedure 3086 for dequantizing a set of transform coefficients representing a tile of an image; and
- a set of inverse transform procedures 3088 for applying inverse filters to a set of dequantized transform coefficients, representing a tile of an image, so as to regenerate that tile of the image.

Overview of Image Processing

The tiles may be processed in a predetermined raster scan order. For example, the tiles in a top row are processed going from one end (e.g., the left end) to the opposite end (e.g., the right end), before processing the next row of tiles immediately below it, and continuing until the bottom row of tiles of the raw image data has been processed.

It should be noted that many image files are not square, but rather are rectangular, and that the square image sizes used in the above examples are not intended to in any way to limit the scope of the invention. While the basic unit of information that is processed by the image processing modules is a tile, any particular image may include an arbitrarily sized array of such tiles. Furthermore, the image need not be an even multiple of the tile size, since the edge tiles can be truncated wherever appropriate.

The designation of a particular resolution level of an image as the "thumbnail" image may depend on the client device to which the image is being sent. For instance, the thumbnail sent to a personal digital assistant or mobile telephone, which have very small displays, may be much smaller than (for example, one sixteenth the size of) the thumbnail that is sent to a personal computer and the thumbnail sent to a device having a large, high definition screen may be much larger than the thumbnail sent to a personal computer having a display of ordinary size and definition. When an image is to be potentially used with a variety of client devices, additional images are generated for the image so that each type of device can initially receive an appropriately sized thumbnail image.

When an image is first requested by a client device, the client device may specify its window size in its request for a thumbnail image or the server may determine the size of the client device's viewing window by querying the client device prior to downloading the thumbnail image data to the client device. As a result, each client device receives a minimum resolution thumbnail that is appropriately sized for that device.

Image File Data Structures

When all the tiles of an image have been transformed, compressed and encoded, along with the residual images, the resulting encoded image data is stored as an image file. The image file includes header data and a sequence of image data structures, sometimes called image subfiles.

In one embodiment, each image file is an html file or similarly formatted web page that contains a link, such as an object tag or applet tag, to an applet (e.g., a Java® applet) that is automatically invoked when the file is downloaded to a client computer. The header and a selected one of the images are used as data input to the embedded applet, which decodes and renders the image on the display of a user's personal digital assistant, cell phone, or computer. The operation of the applet is transparent to the user, who simply sees the image rendered on his/her computer display. Alternately, the applet may present the user with a menu of options including the resolution levels available with the image subfile or subfiles included in the image file, additional image subfiles that may be available from the server, as well as other options such as image cropping options.

In an alternate embodiment, the client workstations include an application, such as a browser plug-in application, for decoding and rendering images in a file format. Further, each image file has an associated data type that corresponds to the plug-in application. The image file is downloaded along with an html or similarly formatted web page that includes an embed tag or object tag that points to the image file. As a result, when the web page is downloaded to a client workstation, the plug-in application is automatically invoked and executed by the client computer's. As a result, the image file is decoded and rendered and the operation of the plug-in application is transparent to the user.

The header of the image tile includes the information needed to access the various image subfiles. In particular, in one embodiment, the header stores:

- an identifier or the URL of the image file in the server;
- a parameter value that indicates the number of image subfiles in the file (or the number of base image files in embodiments in which each base image is stored in a separate file);
- the size of each image data structure; and
- a offset pointer to each image data structure (or a pointer to each image file in embodiments in which each image is stored in a separate file).

Each image subfile has a header and a sequence of bitstreams. In one embodiment, the header data of each base image subfile includes fields that indicate:

- the size of the image subfile (i.e., the amount of storage occupied by the image subfile);
- the size of the tiles (e.g., the number of rows and columns of pixels) used to tile the image, where each tile is separately encoded, as described below;

the color channel components stored for this image subfile; and the number of bitstreams encoded for the image (i.e., for each tile of the image); and information for each of the bitstreams.

The header information for each bitstream in the image subfile may include:

an offset pointer to the bitstream to indicate its position within the image tile (or within the image subfile); and the size of bitstream (how much data is in the bitstream).

Each bitstream may include a sequence of tile subarrays, each of which captains the $i^{th}$ bitstream for a respective tile of the image. The bitstream may optionally include a header having fields used to override parameters specified for the image by the image header. When the image file contains a cropped image, the set of tile subarrays included to the image file is limited to those needed to represent the cropped image.

In one embodiment, the image file header also includes parameters indicating "cropped image boundaries." This is useful for partial copies of the image file that contain data only for a cropped portion of the image, which in turn is useful when a client computer is being used to perform pan and zoom operations in an image. For instance, a user may have requested only a very small portion of the overall image, but at very high resolution. In this case, only the tiles of the image needed to display the cropped portion of the image will be included in the version of the image tile sent to the user's client computer, and the cropped image boundary parameters are used to convey this information to the procedures that render the image an the client computer. Two types of image cropping information may be provided by the image file header. cropping that applies to the entire image file, and any further cropping that applies to specific subimages. For instance, when a client computer first receives an image, it may receive just the lowest resolution level subimage of a particular image, and that subimage will typically not be cropped (compared to the full image). When the client zooms in on a part of the image at a specified higher resolution level, only the tiles of data needed to generate the portion of the image to be viewed on the client computer are sent to the client computer, and thus new cropping parameters will be added to the header of the image file stored (or cached) in the client computer to indicate the cropping boundaries for the subimage level or levels downloaded to the client computer in response to the client's image zoom command.

The table of offset pointers to tiles that is included in the image header for each bitstream in the image is also used during zooming and panning. In particular, when an image file is first downloaded by a client computer or device, the higher level bitstreams may be unpopulated, and thus the table of offset pointers will initially contain null values. When the user of the client devices zooms in on the image, the data for various tiles of the higher level bitstreams are downloaded to the client device, as needed, and the table of offset pointers to tiles is updated to reflect the tiles for which data have been downloaded to the client computer. When the client further pans across the image at the zoomed or higher resolution level, additional tiles of information are sent to the client computer as needed, and the cropping information in the image tile header and the tile offset information in the base image header are again updated to reflect the tiles of data stored for each bitstream.

The information in the headers of the image file and the base image subfiles enables quick indexing into any part of the tile, which enables a computer or other device to locate the beginning or end of any portion of the image, at any resolution level, without having to decode the contents of any other portions of the image file. This is useful, for example, when truncating the image file so as to generate a lower image quality version of the file, or a cropped image version of the file, such as for transmission over a communications network to another computer or device.

Portable Client Device Architecture

Figure 31:
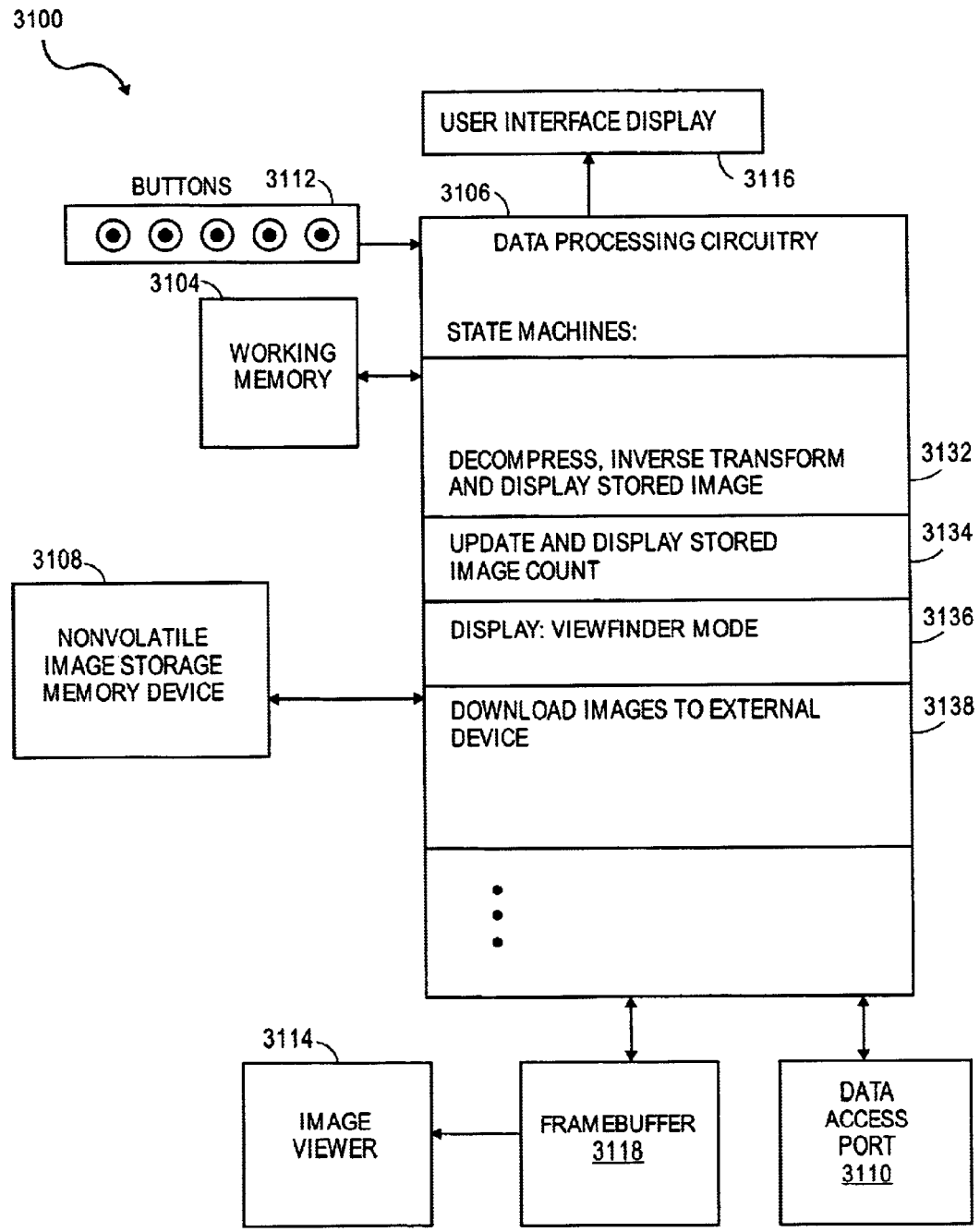
FIG. 31 is a block diagram of a portable client device, such as a PDA or cellular phone.

Referring to FIG. 31, there is shown an embodiment of a portable client device 3100. The system 3100 includes a working memory 3104, typically random access memory, receives digitally encoded image information. More generally, it is used to store a digitally encoded image while the image is being processed by the system's data (i.e., image) processing circuitry 3106. In one embodiment, the data processing circuitry 3106 consists of hardwired logic and a set of state machines for performing a set of predefined image processing operations.

In alternate embodiments, the data processing circuitry 3106 could be implemented in part or entirely using a fast general purpose microprocessor and a set of software procedures. However, at least using the technology available in 2001, it may be difficult to process and store full resolution images (e.g., full color images having 1280×840 pixels) fast enough. If, through the use of parallel processing techniques or well designed software, a low power, general purpose image data microprocessor could support the fast image processing needed by such systems, then the data processing circuit 3106 could be implemented using such a general purpose microprocessor.

Each image, after it has been processed by the data processing circuitry 3106, is typically stored as an "image file" in a nonvolatile memory storage device 3108 (e.g., "flash" (i.e., EEPROM) memory technology).

The system 3100 includes a set of buttons 3112 for giving commands to the system. There will typically be several other buttons to enable the use to select the quality level of the next picture to be taken, to scroll through the images in memory for viewing on the image viewer 3114, to delete images from the nonvolatile image memory 3108, and to invoke all the system's other functions. In one embodiment, the buttons are electromechanical contact switches, but in other embodiments at least some of the buttons may be implemented as touch screen buttons on a user interface display 3116, or on the image viewer 3114.

The user interface display 416 is typically implemented either (A) as an LCD display device separate from the image viewer 414, or (B) as images displayed on the image viewer 414. Menus, user prompts, and information about the images stored in the nonvolatile image memory 108 may be displayed on the user interface display 416, regardless of how that display is implemented.

After an image has been captured, processed and stored in nonvolatile image memory 3108, the associated image file may be retrieved from the memory 3108 for viewing on the image viewer. More specifically, the image tile is converted from its transformed, compressed form back into a data array suitable for storage in a framebuffer 3118. The image data in the framebuffer is displayed on the image viewer 3114.

Still referring to FIG. 31, the system 3100 preferably includes data processing circuitry for performing a predefined set of primitive operations, such as performing, the multiply and addition operations required to apply a transform to a certain amount of image data as well as a set of state machines 3130–3142 for controlling the data processing circuitry so as to perform a set of predefined image handling operations. In one embodiment, the state machines in the system are as follows:

One or more state machines 3132 for decompressing, inverse transforming as described above and displaying a stored image tile on the system's image viewer. The reconstructed image generated by the techniques described above is stored in system's framebuffer 3118 so that it can be viewed on the image viewer 3114.

Alternate Embodiments

Generally, the present invention is useful in any "memory conservative" context where the amount of working memory available is insufficient to process entire images as a single tile, or where a product must work in a variety of environments including low memory environments, or where an image may need to be conveyed over a low bandwidth communication channel or where it may be necessary or convenient to providing image at a variety of resolution levels.

In streaming data implementations, such as in a web browser that receives compressed images encoded using the present invention, subimages of an image may be decoded and decompressed on the fly, as the data for other higher level subimages of the image are being received. As a result, one or more lower resolution versions of the compressed image may be reconstructed and displayed before the data for the highest resolution version of the image is received (and/or decoded) over a communication channel.

In alternate embodiments, the image tiles could be processed in a different order. For instance, the image tiles could be processed from right to left instead of left to right. Similarly, image tiles could be processed starting at the bottom row and proceeding toward the top row.

The present invention can be implemented as a computer program product that includes a computer program mechanism embedded in a computer readable storage medium. For instance, the computer program product could contain the program modules shown in FIG. 31. These program modules may be stored on a CD-ROM, magnetic disk storage product, or any other computer readable data or program storage product. The software modules in the computer program product may also be distributed electronically, via the Internet or otherwise, by transmission of a computer data signal (in which the software modules are embedded) on a carrier wave.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method for processing an image comprising:
   receiving a portion of an encoded version of a downsized image and one or more encoded residual images;
   decoding the portion of the encoded version of the downsized image to create a decoded portion of the downsized image;
   decoding a portion of at least one of the one or more encoded residual images;
   enlarging the decoded portion of the portion of the downsized image; and
   combining the enlarged and decoded portion of the downsized image with at least a first decoded residual image to create a new image.

2. The method defined in claim 1 further comprising:
   enlarging the new image;
   combining the enlarged new image with a second decoded residual image to create another image.

3. The method defined in claim 2 wherein combining the enlarged new image with a second decoded residual image comprises decoding at least one encoded image to create the second decoded residual image.

4. The method defined in claim 1 wherein the encoded version of the downsized image is a JPEG encoded version of the downsized image, and the encoded version of the at least one residual image is a JPEG encoded version of the at least one residual image in which JPEG encoding used an MPEG Huffman table.

5. The method defined in claim 1 wherein enlarging the decoded downsized image comprises performing bilinear interpolation on the decoded downsized image.

6. The method defined in claim 1 wherein decoding the encoded version of the downsized image comprises JPEG decoding of the downsized image.

7. The method defined in claim 1 wherein decoding the encoded version of the downsized image comprises MPEG decoding the at least one encoded residual image.

8. The method defined in claim 1 wherein the decoded version of the downsized image comprises a bit stream of encoded dictionary look up information; and further wherein decoding the encoded version of the downsized image comprises performing entropy encoding using a dictionary and applying a spline based high-frequency content matching/compensation.

9. The method defined in claim 1 further comprising repeating the operations for all tiles.

10. The method defined in claim 1 further comprising repeating the operations for all tile portions in a tile.

11. The method defined in claim 1 wherein the at least a portion of the encoded version of the downsized image results in creating a thumbnail version of the image.

12. The method defined in claim 1 wherein at least a portion of the encoded version of the downsized image comprises a tile.

13. The method defined in claim 1 wherein at least a portion of encoded version of the downsized image comprises a quarter of a tile.

14. The method defined in claim 1 wherein creation of the new image occurs in response to a signal to zoom in on a viewed image.

15. The method defined in claim 1 wherein creation of the new image occurs in response to a signal to pan a viewed image.

16. The method defined in claim 1 wherein creation of the new image occurs on a cell phone.

17. The method defined in claim 1 wherein creation of the new image occurs on a portable device.

18. The method defined in claim 1 wherein the portion of the first residual image comprises a tile.

19. The method defined in claim 1 wherein the portion of the first residual image comprises a quarter square section of a tile.

20. An apparatus comprising:
    communication circuitry operable to receive a portion of an encoded version of a downsized image and one or more encoded residual images;

a memory coupled to store information received using the communication circuitry;

data processing circuitry to decode the portion of the encoded version of the downsized image to create a decoded portion of the downsized image, decode a portion of at least one of the one or more encoded residual images, enlarge the decoded portion of the portion of the downsized image, and combine the enlarged and decoded portion of the downsized image with at least a first decoded residual image to create a new image; and a display coupled to the data processing circuitry to display the new image.

21. The apparatus defined in claim 20 wherein the data processing circuitry enlarges the new image and combines the enlarged new image with a second decoded residual image to create another image.

22. The apparatus defined in claim 21 wherein the data processing circuitry combines the enlarged new image with a second decoded residual image comprises decoding at least one encoded image to create the second decoded residual image.

23. The apparatus defined in claim 20 wherein the encoded version of the downsized image is a JPEG encoded version of the downsized image, and the encoded version of the at least one residual image is a JPEG encoded version of the at least one residual image in which JPEG encoding used an MPEG Huffman table.

24. The apparatus defined in claim 20 wherein the data processing circuitry enlarges the decoded downsized image by performing bilinear interpolation on the decoded downsized image.

25. The apparatus defined in claim 20 wherein the data processing circuitry includes a JPEG decoder and decodes the encoded version of the downsized image by JPEG decoding the downsized image.

26. The apparatus defined in claim 20 wherein the data processing circuitry comprises an MPEG decoder and decodes the encoded version of the downsized image by MPEG decoding the at least one encoded residual image.

27. The apparatus defined in claim 20 wherein the decoded version of the downsized image comprises a bit stream of encoded dictionary look up information; and further wherein the data processing circuitry comprises a spline-wavelet based dequantizer and decodes the encoded version of the downsized image comprises performing entropy encoding using a dictionary and applying the spline-wavelet based high-frequency content matching/compensation.

28. The apparatus defined in claim 20 wherein the communication circuitry comprises a wireless communication circuitry.

29. The apparatus defined in claim 20 wherein the communication circuitry comprises a personal digital assistant (PDA) communication circuitry.

30. The apparatus defined in claim 20 wherein the communication circuitry receives a portion of a second residual image, and the data processing circuitry decodes the portion of the second residual image to create a decoded portion of the second residual image.

31. The apparatus defined in claim 20 wherein creation of the new image occurs in response to a signal to zoom in on a viewed image.

32. The apparatus defined in claim 20 wherein creation of the new image occurs in response to a signal to pan a viewed image.

33. The apparatus defined in claim 20 wherein creation of the new image occurs on a cell phone.

34. The apparatus defined in claim 20 wherein creation of the new image occurs on a portable device.

35. The apparatus defined in claim 20 wherein the portion of the first residual image comprises a tile.

36. The apparatus defined in claim 20 wherein the portion of the first residual image comprises a quarter square section of a tile.

* * * * *